March 12, 1946.    F. E. STRATTON    2,396,349
FASTENING-INSERTING MACHINE
Filed Aug. 5, 1943    12 Sheets-Sheet 5

INVENTOR
Frank E. Stratton

March 12, 1946. F. E. STRATTON 2,396,349
FASTENING-INSERTING MACHINE
Filed Aug. 5, 1943 12 Sheets-Sheet 6

INVENTOR
Frank E. Stratton
By his attorney

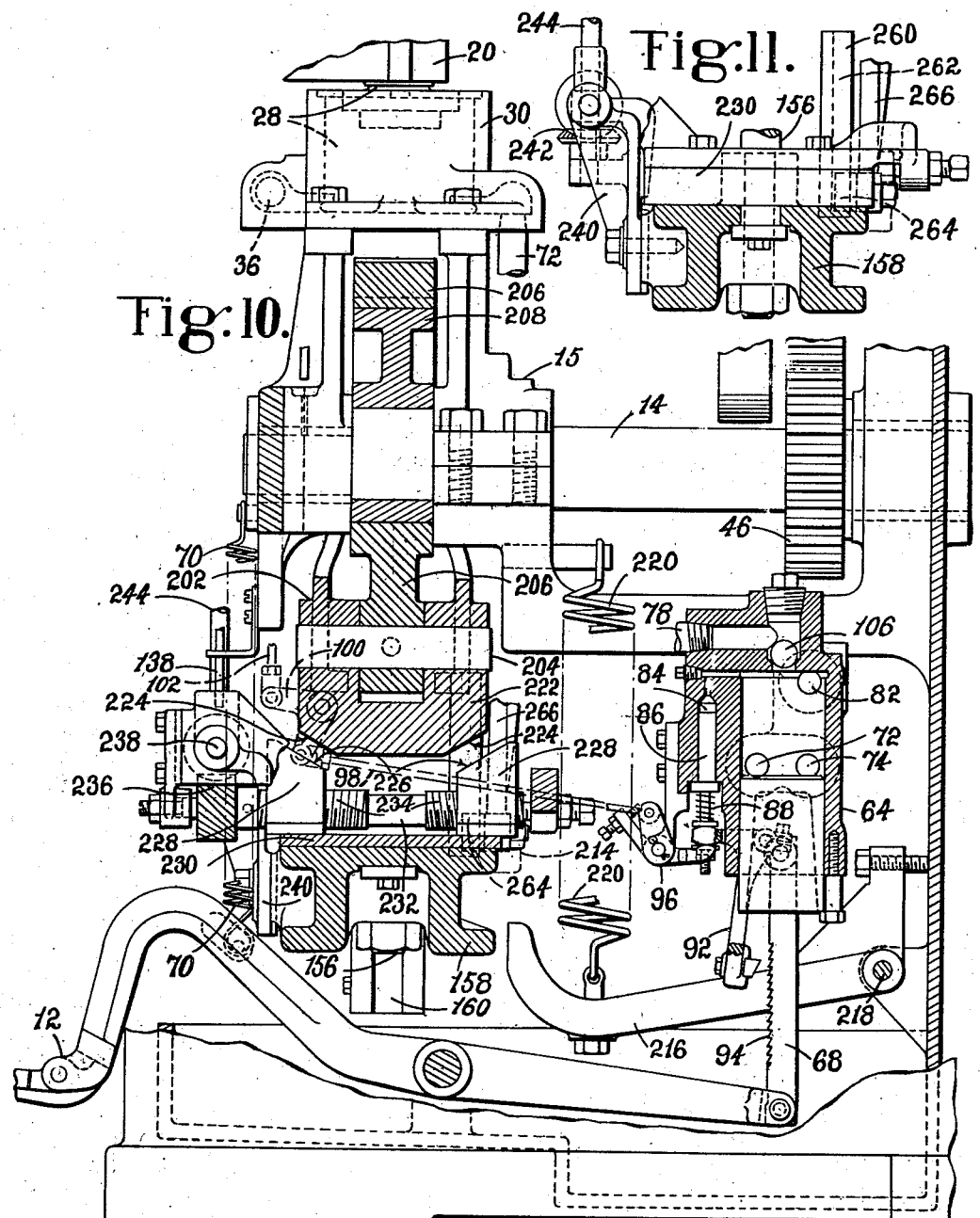

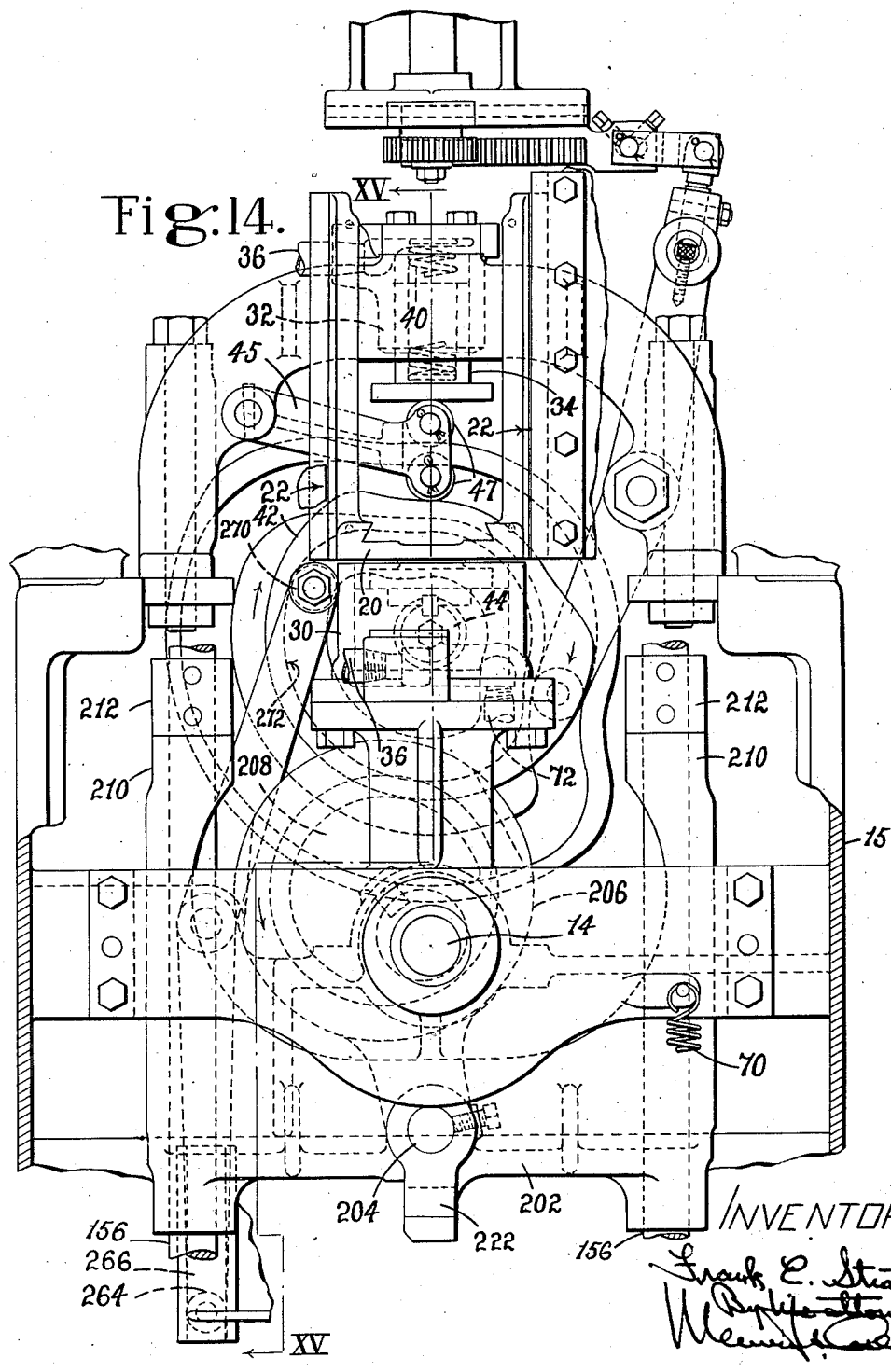

March 12, 1946.   F. E. STRATTON   2,396,349
FASTENING-INSERTING MACHINE
Filed Aug. 5, 1943   12 Sheets—Sheet 11
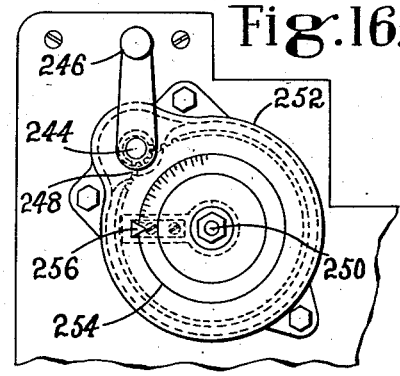
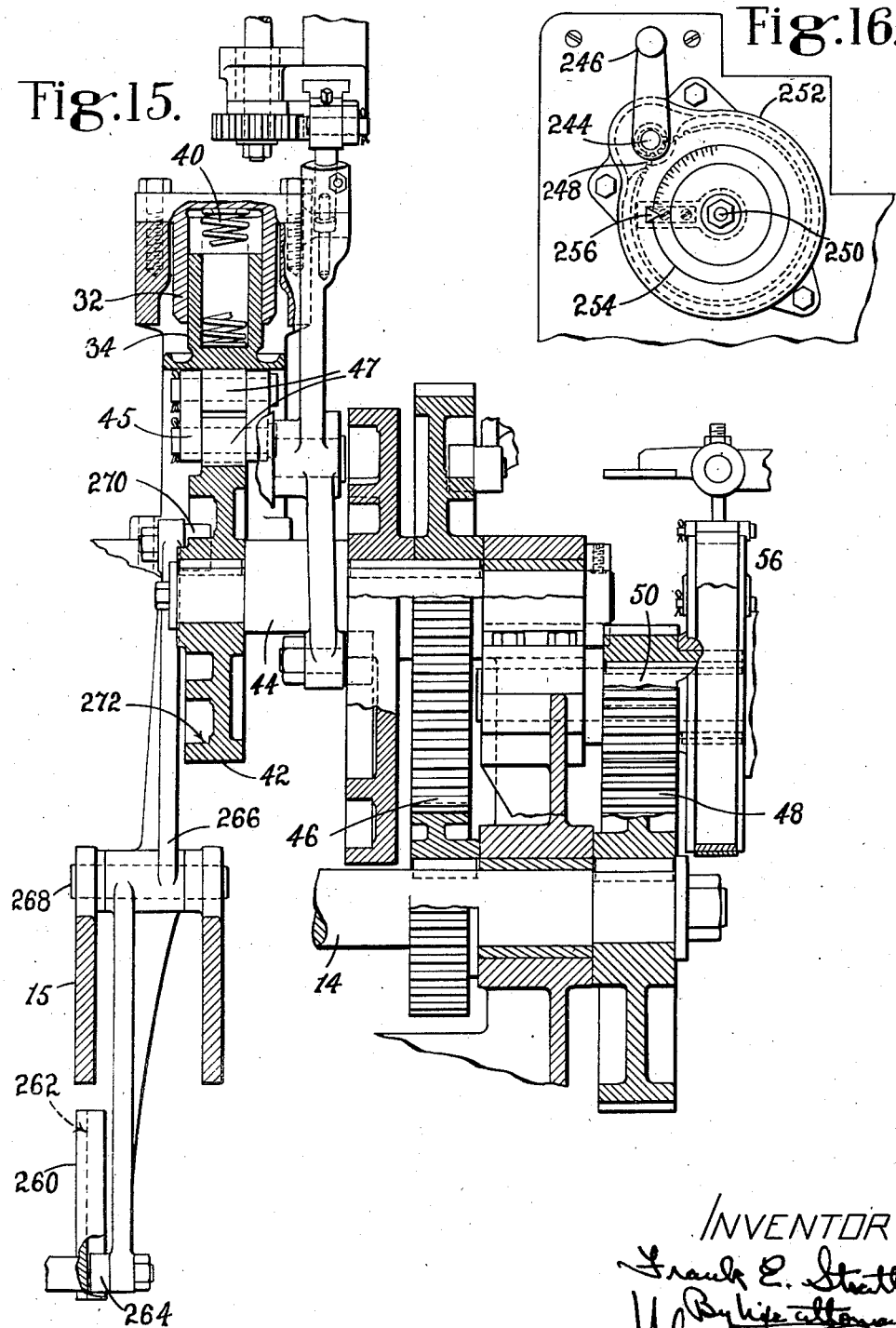
INVENTOR
Frank E. Stratton
By his attorney

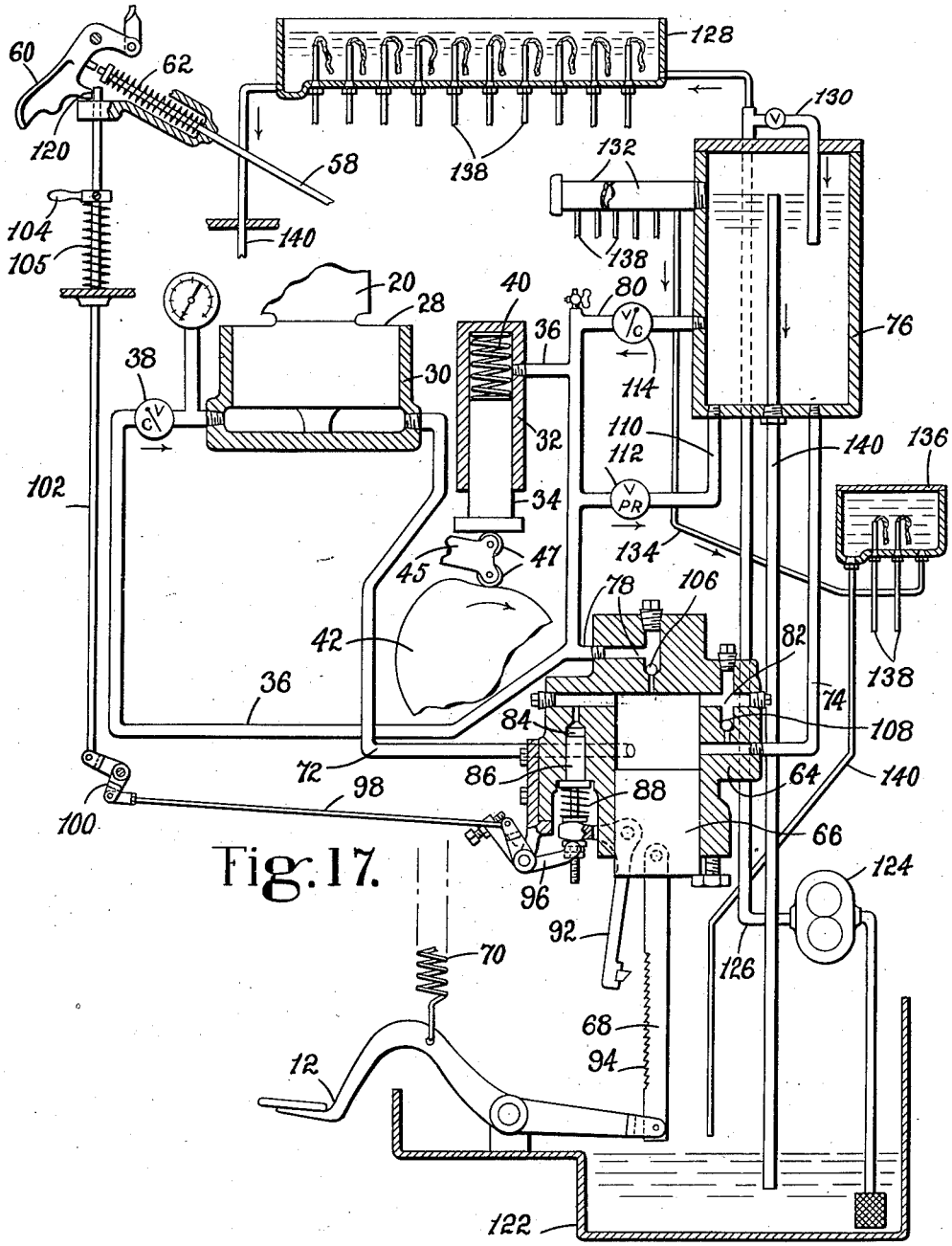

Patented Mar. 12, 1946

2,396,349

UNITED STATES PATENT OFFICE 2,396,349

FASTENING-INSERTING MACHINE

Frank E. Stratton, Beverly, Mass., assignor to United Shoe Machinery Corporation, Flemington, N. J., a corporation of New Jersey Application August 5, 1943, Serial No. 497,461

59 Claims. (Cl. 1—32)

My invention relates to machines by which work-portions are secured to each other, as in the attachment of heel-parts to the heel-seats of shoes. It is particularly concerned with machines of the character disclosed in Letters Patent of the United States No. 2,293,624, Parkhurst, August 18, 1942, and in which the attachment of heels is effected by fastenings cut from strings of fiber.

An object of this invention is to increase the efficiency of such a machine and its smoothness and certainty of operation and to facilitate its control by the operator. This object is attained through the following features: In fluid-pressure mechanism by which the work is held for an operation upon it, the member through which the operator exercises control is positively retained in its active position. Initiation of the power-cycle of the machine is guarded against until the work is properly located for the operation upon it. With oil-actuated mechanism through which fluid-pressure is applied to the work, a lubricating system is combined. An adjustable mounting of the fastening-drivers upon their carrier is provided, which renders their alinement more certain and the machining operations easier. The pricking and inserting strokes of the fastening-drivers are made accurately to predetermined extents and without shock. A control of certain of the drivers, as those acting at the breast of a heel, is effected in a simple and reliable manner. The strings of material from which the fastenings are severed are advanced in different lengths corresponding to different depths to which they are to be inserted, as, respectively, at the periphery of a heel and at its breast. String-feeding rolls are so mounted as to facilitate the rethreading of the strings upon change of the inserting design, and novel means is furnished for varying the feeding pressure applied to the rolls. There is simplified mechanism for feeding the strings, whether these are in one or a plurality of groups, together with means for accurately varying the length of feed. The selective feed of the strings during only the pricking stroke of the drivers is produced by the travel of the loader-block, or similar member, which transfers fastenings to the inserting mechanism, and, at the same time, the positioning of the group of drivers which are movable upon their carrier is effected by the same means.

On June 28, 1944, there was filed in the United States Patent Office a divisional application directed to the signaling system of this invention, it bearing the Serial Number 542,574.

In the accompanying drawings.

Figure 3:
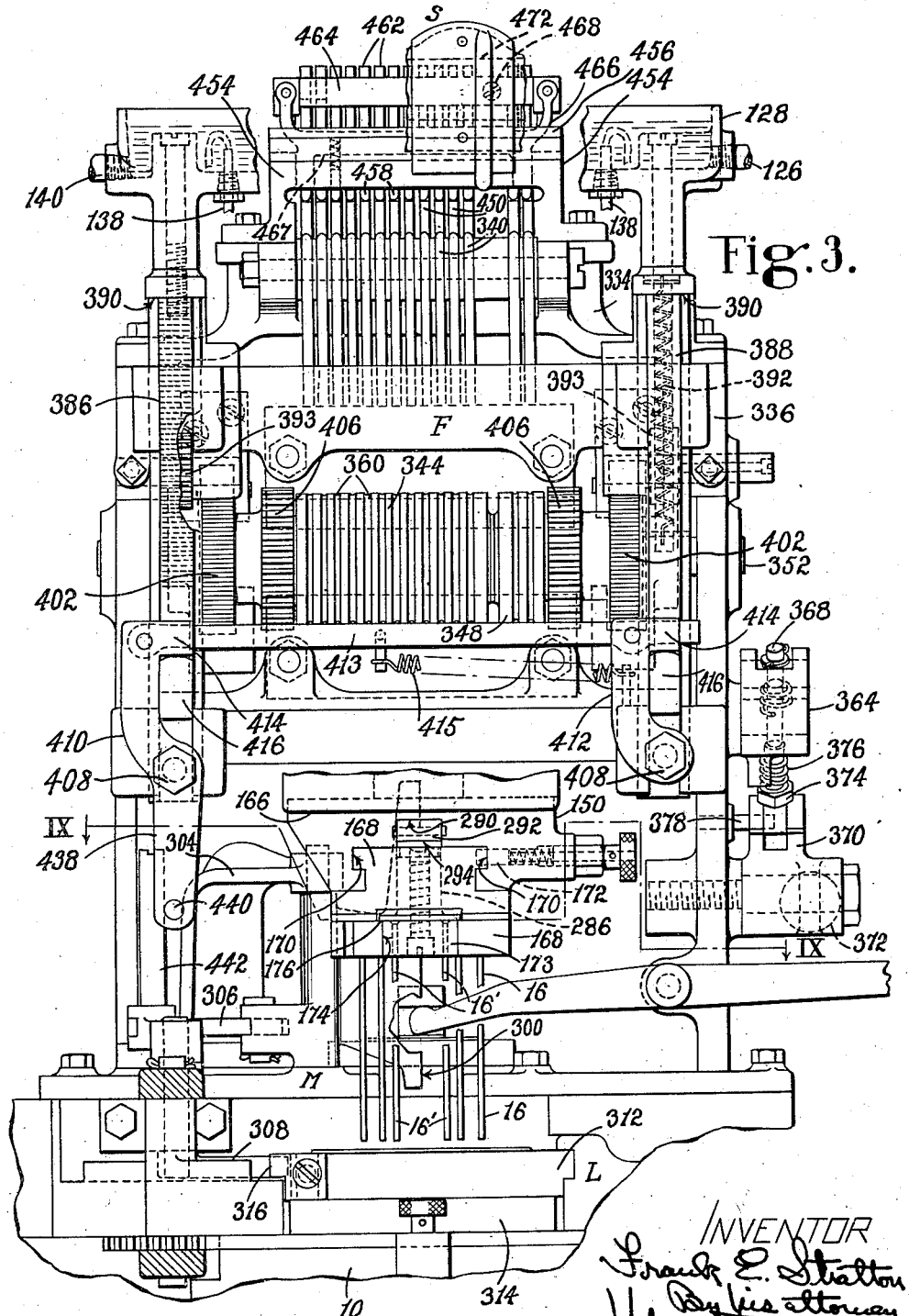
Figure 4:
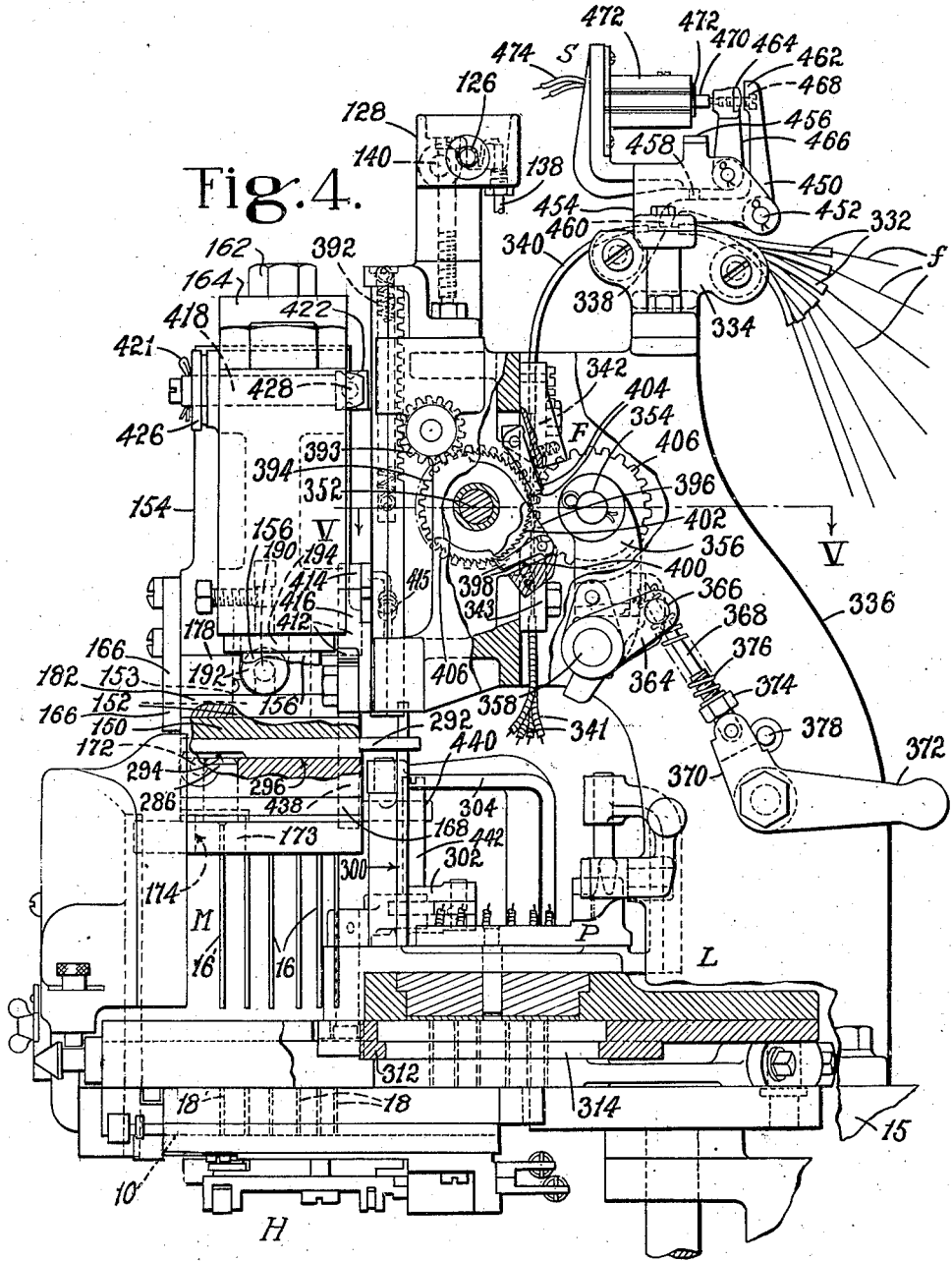
Figure 5:
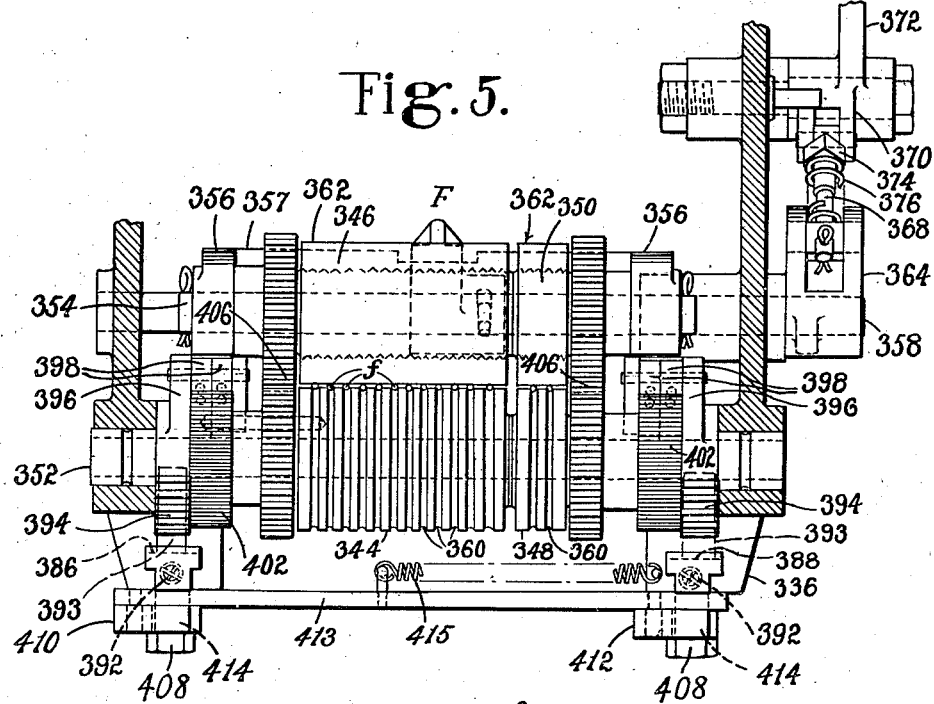
Figure 6:
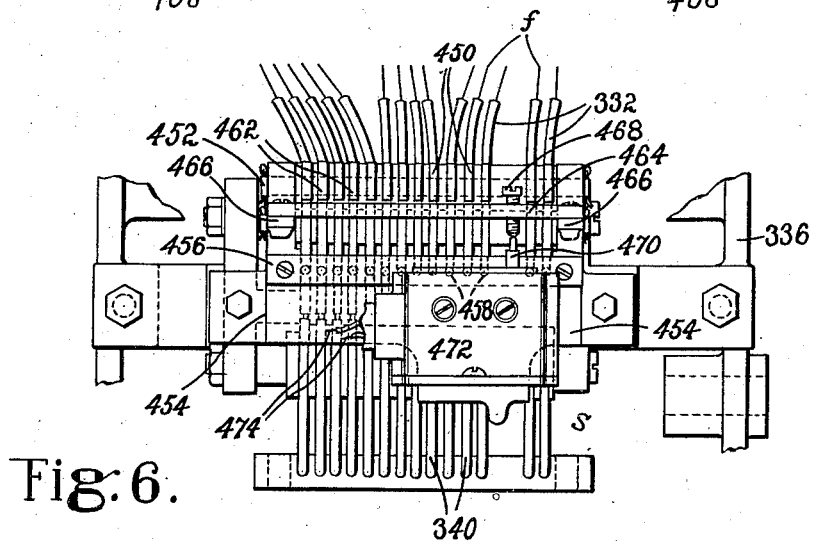
Figures 7, 8:
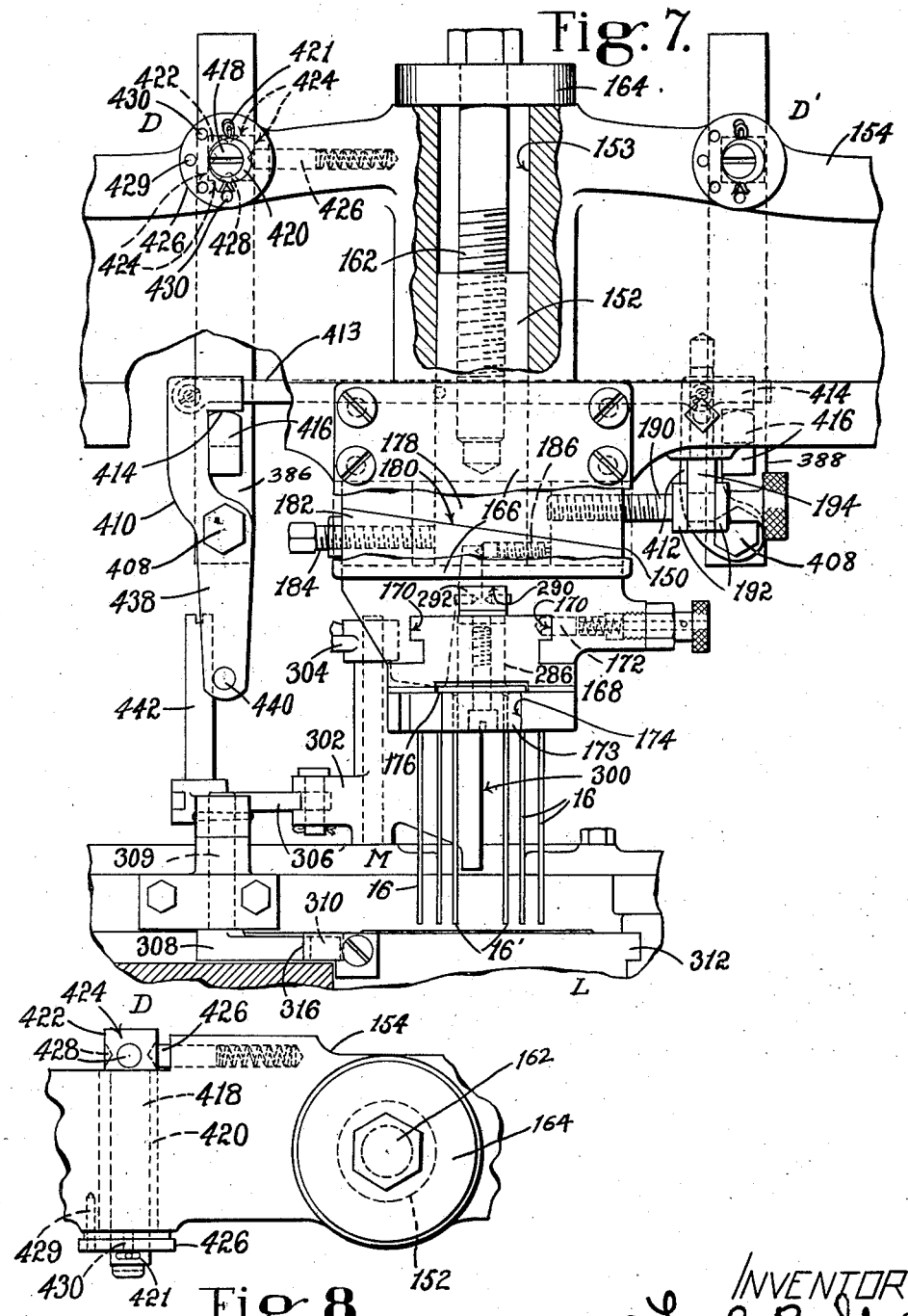
Figure 9:
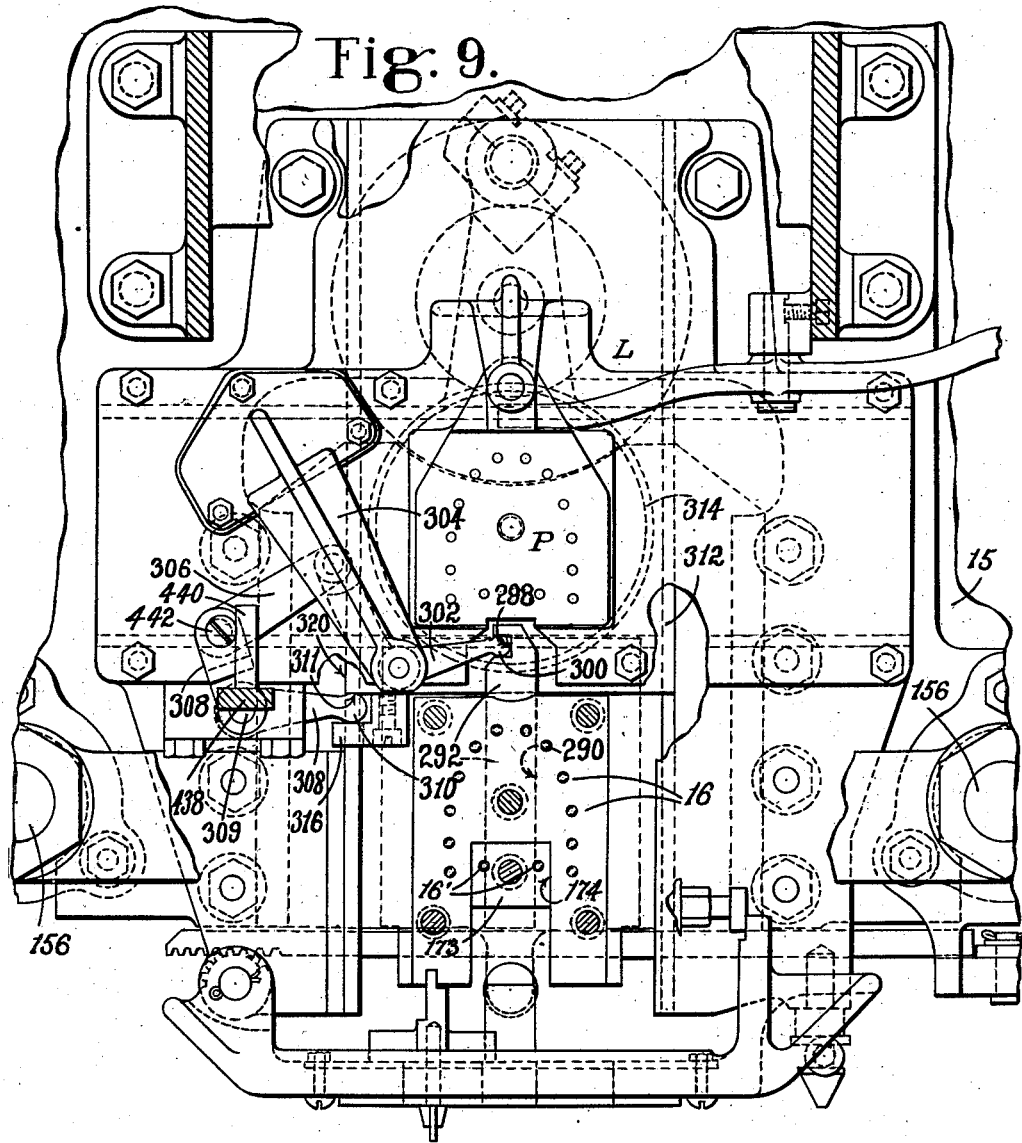
Figure 13:
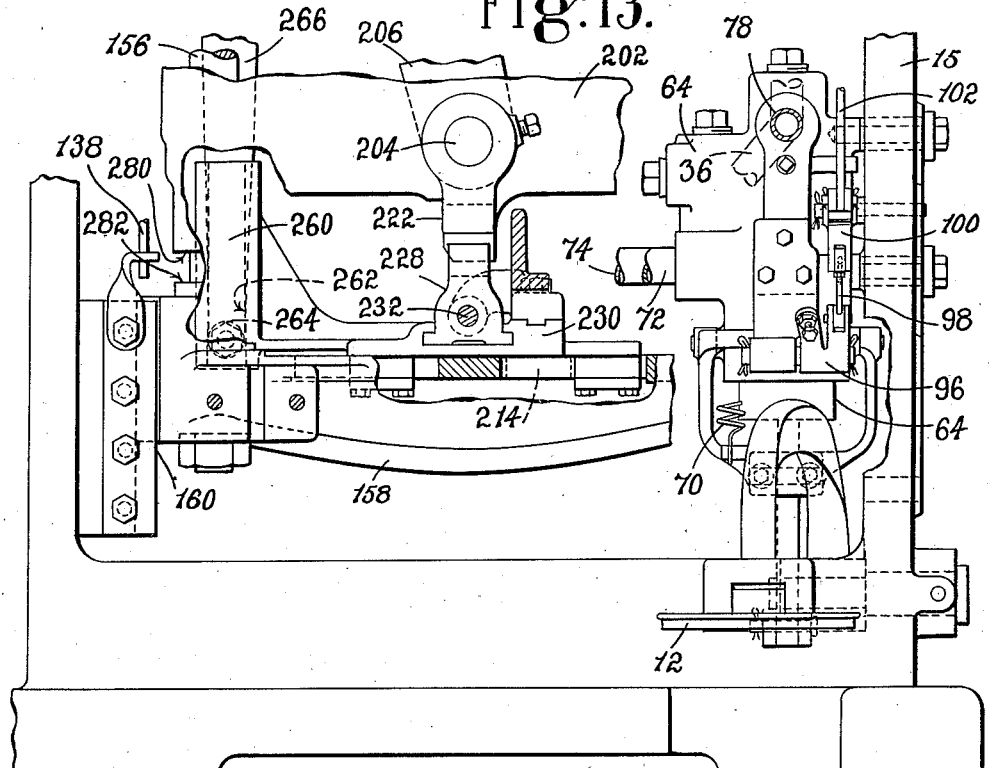
Figure 12:
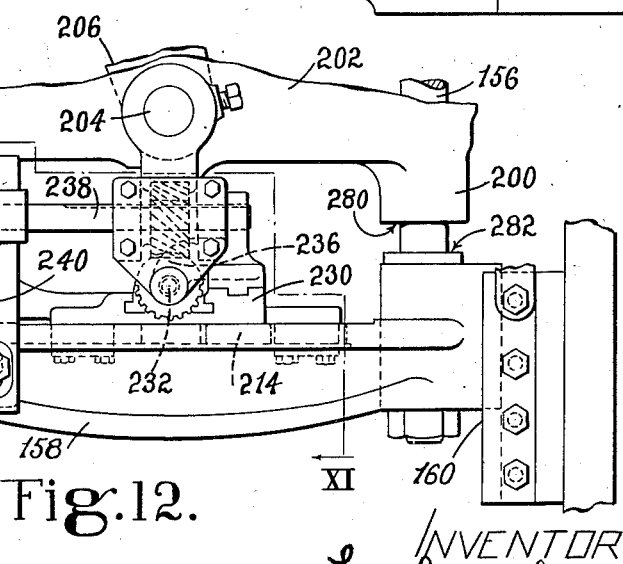

Fig. 3, an enlarged broken front elevation of the fastening-inserting mechanism and the fiber-feeding mechanism;

Fig. 4, a broken side elevation looking from the right in Fig. 3;

Fig. 5, a horizontal section on the line V—V of Fig. 4, showing the feed-rolls;

Fig. 6, a top plan view of the signaling mechanism associated with the feed-rolls;

Fig. 7, an enlarged front elevation of the mounting for the drivers, together with a portion of the actuating means for the feeding mechanism;

Fig. 8, a plan view of the adjusting means for the length of feed of the fiber;

Fig. 9, a horizontal section on the line IX—IX of Fig. 3;

Fig. 10, an enlarged central vertical section through the actuating mechanism for the drivers, together with the treadle mechanism;

Fig. 11, a sectional detail on the line XI—XI of Fig. 12;

Fig. 12 shows in front elevation, and upon a smaller scale, the actuating mechanism of Fig. 10;

Fig. 13, a similar view taken somewhat at the rear of Fig. 12;

Fig. 14, a front elevation of the eccentric and cam mechanism, which produces the reciprocation of the drivers, determines the extent of the pricking and inserting strokes of said drivers and applies final pressure to the work;

Fig. 15, a partial vertical section on the line XV—XV of Fig. 14;

Fig. 16, a top plan view of the means whereby the pricking stroke of the drivers may be varied; and Fig. 17, a diagram illustrating the hydraulic-pressure and lubricating systems of the machine.

Figure 1:
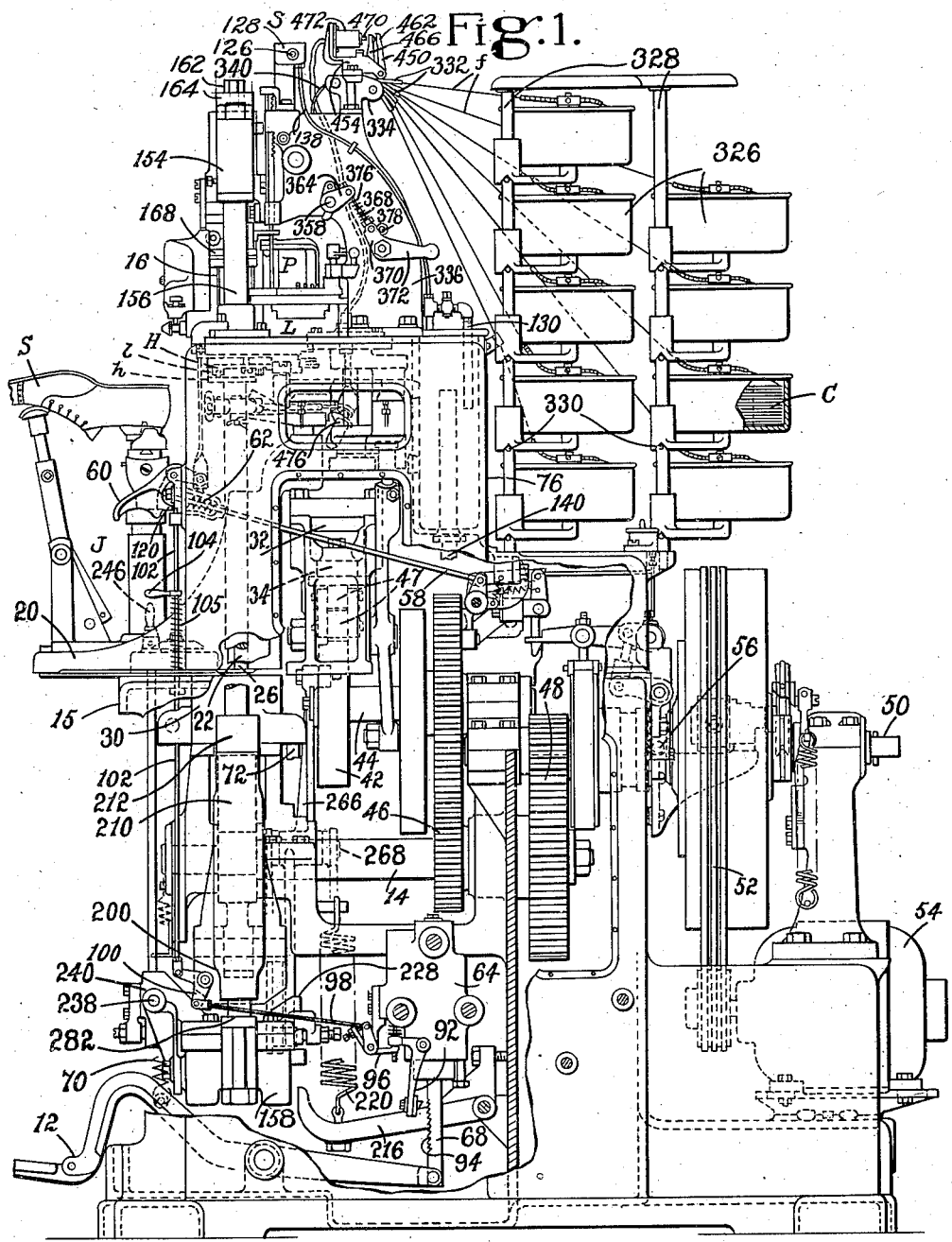
Fig. 1 shows in side elevation one of several possible embodiments of my invention.
Figure 2:
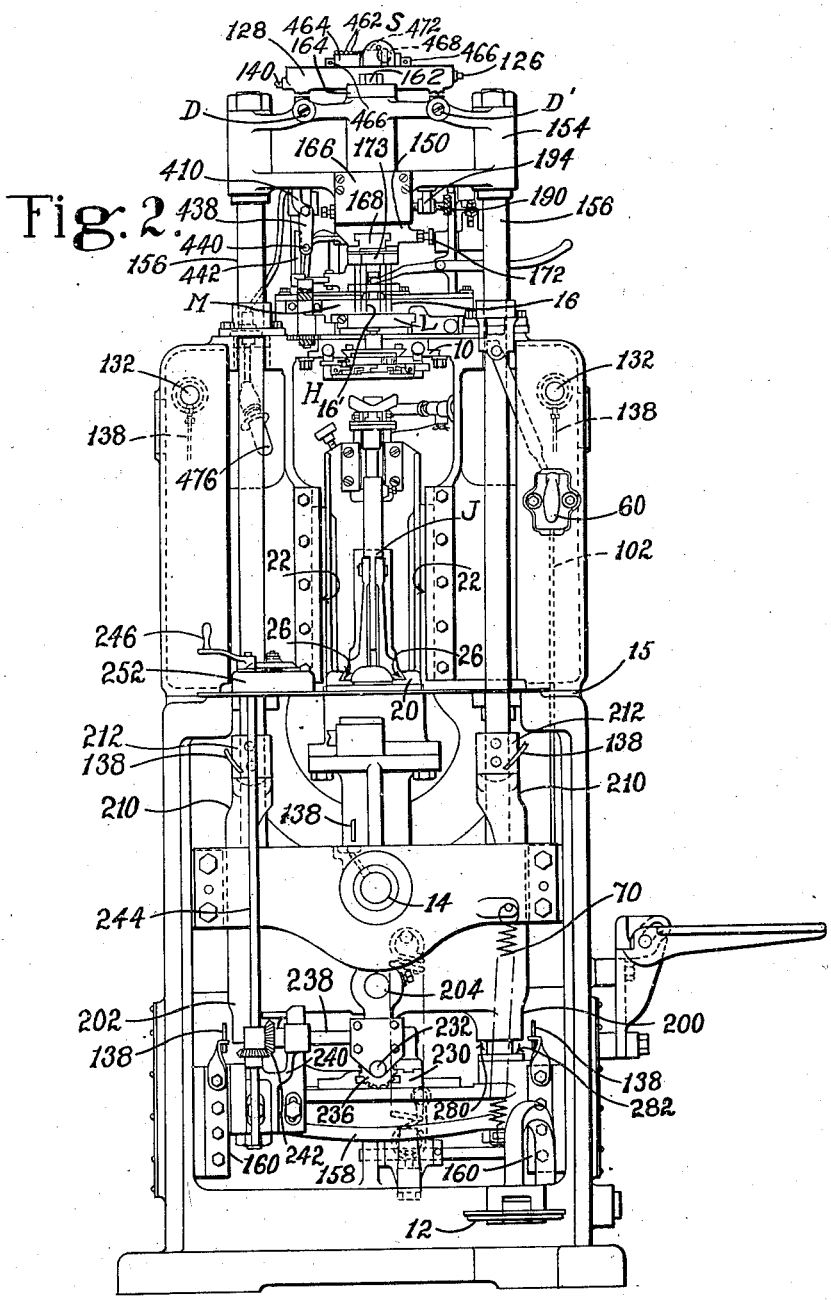
Fig. 2 is a front elevation thereof.

Generally, the machine of this invention is of the same character as that disclosed in the previously mentioned patent. The features common to the two machines will be but briefly described. The work, as a shoe S to be heeled (Fig. 1), is supported upon a jack J beneath a die and abutment 10 of fastening mechanism M (Fig. 2). With the die is associated a holder H retaining against the underside of said die a top-lift $l$, which may be of rubber, and below this a heel-base $h$. The heel-seat of the shoe is brought into preliminary engagement with the heel-base in the holder by the actuation of a treadle 12, and receives final work-clamping pressure under the influence of a rotatable power-shaft 14, journaled horizontally in the frame 15 of the machine. Reciprocatory drivers 16, 16' (Figs. 2, 3, 4, 7 and 9) of the inserting mechanism M act through multiple fastening-receiving passages 18, 18' in the die to first serve as awls, pricking through the heel-parts into the heel-seat of the shoe, and, upon a second movement, inserting fastenings in the pricked openings. These fastenings preferably consist of pegs cut from strings of fiber f, advanced from feeding mechanism F to the loading mechanism L through foot-plate mechanism P. The feeding mechanism is operated under the influence of the pricking stroke of the drivers to advance the correct lengths of the fiber strings into passages in the loading mechanism. Said loading mechanism then acts to shear off discrete fastenings and transfer these above the die-passages, presenting them to receive the inserting stroke of the drivers. As herein illustrated, the drivers 16 and their receiving die-passages 18 are each twelve in number, these being arranged to act about the curved periphery of the heel, while two drivers 16' and their passages 18' act at the breast of said heel.

Considering now the jack J, this is mounted upon a slide 20, reciprocated vertically in ways 22 upon the machine frame (Fig. 2). It is movable horizontally upon the slide in ways 26 between a forward work-receiving position and a rearward operating position. Referring particularly to Figs. 1, 10 and 17, the slide 20 rests upon a piston 28, movable in a cylinder 30 mounted upon the frame. Also carried by the frame is a cylinder 32, of smaller diameter than the cylinder 30 and in which is a piston 34. The two cylinders communicate with each other through a conduit 36 controlled by a check-valve 38 opening toward the cylinder 30. The piston 34 is raised against the force of a spring 40, interposed between it and the cylinder-head, by a cam 42 fast upon a shaft 44, journaled in the frame and rotated through spur-gearing 46 from the shaft 14, once for each operating cycle. The action of the cam is shown as communicated to the piston through a lever 45 fulcrumed upon the frame and provided with a pair of rotatable rolls 47, 47, respectively engaging said cam and piston (Fig. 14). The shaft 14 receives power through spur-gearing 48 from a main driving shaft 50, belted at 52 to a motor 54. Clutch mechanism 56 for controlling a power-cycle of the machine is tripped when a rod 58 is pushed rearwardly by the operator through a hand-lever 60. An expansion-spring 62 maintains the rod normally retracted.

In a vertical cylinder 64, a piston 66 is movable, and linked to this piston at 68 is the treadle 12. The piston is lowered and the treadle normally raised by a tension-spring 70. Conduits 72 and 74, connected to the cylinder 64 at points normally just above the lowered piston 66, lead, respectively, to the bottom of the jack-cylinder 30 and to a supply-tank 76 for some such liquid as oil. The upper portion of the treadle-cylinder 64 is joined to the jack-cylinder 30 and to the cylinder 32, through a conduit 78 by way of the conduit 36. A conduit 80 extends from the conduit 36 to the tank 76. A passage 82 in the cylinder-wall joins the cylinder 64 to the conduit 74 leading to the tank. Beside the treadle-cylinder 64 is a vertical cylinder 84, in which is a piston 86 normally raised by an expansion-spring 88 surrounding its rod. The piston 86 acts through the spring 88 upon a pivoted latch 92, movable into engagement with a series of teeth 94 upon the link 68 between the treadle and the piston 66. The latch may be released manually through a chain of connections, including a bell-crank-lever 96, a link 98, a bell-crank-lever 100 and a rod 102, on which is a handle 104 adjacent to the hand-lever 60. The rod and handle are urged normally up by an expansion-spring 105, holding the latch withdrawn from the teeth on the link 68. Above the piston 86, the cylinder 84 opens into the top of the cylinder 64. In the conduit 78 above the cylinder 64 is a check-valve 106, opening from said cylinder. A check-valve 108 in the passage 82 opens from the conduit 74 toward the cylinder 64. The conduit 36 is joined to the tank 76 by a conduit 110, in which is a relief-valve 112 opening toward the tank. It is set to blow off when pressure in the jack-cylinder 32, created by movement of the piston 34, exceeds the desired amount. A check-valve 114 is included in the conduit 80, opening from the tank.

To elevate the jack J with an applied shoe to the operating position beneath the die 10, the operator depresses the treadle 12, raising the piston 66 in the cylinder 64. The conduits 72 and 74 are at once closed by the piston, whereupon its travel, acting through the liquid filling the system from the tank 76, creates pressure through the conduit 36, the passage 82 being closed by the check-valve 108. This pressure is applied through the open check-valve 106 to the cylinder 30 beneath the piston 28, which has been lowered by its weight and that of the jack elements which it supports. The piston and jack are thereby lifted to the operating position of the latter, the jacked shoe exerting upon the heel-portions h and l, held beneath the die, a relatively light pressure which permits the work to be adjusted by the operator. As the piston 66 rises to create the jack-elevating force through the conduit 36, pressure is simultaneously applied to the cylinder 84 above the piston 86. Therefore, this piston is lowered, and the latch 92 is moved through the spring 88 into its retaining position against the teeth 94 upon link 68, the spring 105 compressing as the rod 102 descends. Both the conduit 36 and the passage 82 are at this time closed against the escape of pressure, so the piston 86 cannot rise. The engagement between the latch and the link-teeth positively locks the treadle 12 and the piston 66 against movement by the spring 70. Such leakage as may occur past the piston 86 will be insufficient to withdraw the latch from the teeth. The operator, by pressing the hand-lever 60 from him, trips the clutch 56, and the cam 42 turns through 360° quickly elevating the piston 34. This produces pressure in the cylinder 32, which is communicated past the check-valve 38 to the cylinder 30 and transmitted through the piston 28 to the jack to produce relatively heavy clamping pressure upon the work, to the degree allowed by the relief-valve 112. Because of the check-valve 38, the pressure which has been created in the cylinder 30 is temporarily locked therein. This prevents possible forcing away of the work from the die 10, if the drivers co-operating therewith in their pricking stroke encounter a resistance, say that offered by an unusually hard heel, which produces a momentary back-pressure greater than that for which the relief-valve is set.

As the operating cycle approaches its termination, the abrupt return of the periphery of the cam 42 to its minimum radius allows the spring 40 to lower the piston 34 to its initial position. This descent of the piston causes suction to be created in the conduits 36 and 78, opening the check-valve 106 and withdrawing liquid from the latching cylinder 84, so the piston 86 is lifted by the springs 88 and 105. The latch 92 thereupon releases the link 68, and the piston 66 and the treadle 12 are restored to normal by the spring 70. To avoid resistance to this movement by the creation of a vacuum in the cylinder 64, liquid is admitted from the tank 76 through the conduit 74, check-valve 108 and passage 82. As the piston 66 approaches the end of its downward travel, it opens the conduits 72 and 74, and through these the liquid flows from the cylinder 30 to the tank, the piston 28 and the jack J falling to their initial positions. If, before starting the power-cycle of the machine, the operator wishes to free the work which has been clamped by the depression of the treadle, he depresses the handle 104. This withdraws the latch 92 from the link 68, so the spring 70 is free to lower the piston 66 and raise the treadle 12. Pressure is removed from the cylinders 30 and 84, so the jack falls and the latching piston 86 rises.

To prevent tripping the clutch 56 and starting the power-cycle of the machine, until the work has been raised to operating position, the hand-lever 60 is interlocked at 120 with the rod 102 joined to the latch 92. In the normal operation of the machine, the hand-lever is secured against actuation until the upper end of the rod has been lowered from its path by the pressure produced in the cylinder 84 by the piston 66 when the operator treadles the machine, at which time the jack J has brought the work against the die 10. If, however, the operator wishes to ensure the full advance of the first load of pegs to be used for the attachment of a heel when the machine is started, it is possible to obtain a preliminary feed without elevation of the jack. For this purpose, the handle 104 is held down, freeing the hand-lever 60, which is then depressed to produce a power-cycle of the machine. This disposes of uneven ends of the strings which may have been in the loading mechanism L.

Associated with the oil-actuated pressure-system just described, is a lubricating system for movable elements of the machine. As best shown in Fig. 17, there is a sump or receptacle 122, from which a pump 124 supplies oil through a conduit 126 to an elevated receptacle 128, and through a connection 130 from the conduit to the tank or primary receptacle 76. From the latter tank, secondary receptacles 132 open, one joined by a conduit 134 to a receptacle 136. From each of the secondary receptacles 128, 132 and 136, conduits 138 lead to the parts to which oil is to be delivered. The excess of oil in the tank 76 and receptacles 128 and 136 is returned to the sump by conduits 140.

As already pointed out, the drivers 16 and 16' are reciprocated twice through the passages 18 and 18' in the die 10 during each operating cycle, for the successive pricking and fastening-inserting strokes. These drivers are carried by a block 150 (Figs. 3, 4 and 7), from which rises a stem 152 fitting a vertical bore 153 in a top-girt or primary carrier 154. The top-girt is bridged between the upper extremities of side-rods 156, 156, reciprocable in the frame 15 and connected at their lower ends by a cross-girt 158 guided in vertical ways 160 upon the frame (Figs. 2, 12 and 13). The block 150 is fixed in position in the top-girt with the drivers in accurate registration with the passages of the die and of the interposed loading mechanism by a screw 162, threaded into the stem and with its head bearing upon a washer 164 resting upon the top-girt. At the front, the block is maintained against turning about the axis of the stem by bearing against a vertical plate 166, secured to the top-girt. The drivers are fixed in a plate 168, having upper and lower sections. This plate is held in horizontal ways 170 in the block 150, and is latched in place at 172 to allow for changes of the drivers for different inserting designs. The breast-drivers 16' are mounted upon a secondary plate or carrier 173 in a recess 174 in the front of the main plate 168. They are capable of some vertical movement, and are held against downward displacement by an overhang at 176. To allow the lower ends of all the drivers to be adjusted with relation to the work, there is interposed between the top-girt 154 and the block 150 a wedge 178, variable in position against an under surface of the top-girt transversely of the driver-assembly. An inclined surface 180 is furnished by a wedge 182, resting upon the block beneath the wedge 178 and which, by screws 184 and 186 threaded opposite to each other into the wedge 182 and the stem 152, respectively, may be given a preliminary or setting-up adjustment. The upper wedge 178 passes through an opening in the stem and may be shifted by a screw 190 threaded into it, and held against longitudinal movement by flanges 192, 192 lying upon opposite sides of a retaining member 194, depending from the top-girt. If the screw 190 is turned to carry the wedge 178 to the left (Fig. 7), the plane to which the fastening-engaging ends of the drivers are advanced will be lower. Opposite movement of the wedge permits the drivers to be raised. In the first case, the screw 162 is rotated contraclockwise to lower the block 150, so the wedge may be shifted, and then the screw tightened to lock the adjustment. In the second, clockwise rotation of the screw 162 takes up the space left by the withdrawal of the wedge.

The top-girt 154 with the drivers 16, 16' are actuated positively to give both the pricking and inserting strokes to predetermined planes. The depth of pricking may be just through the insole, short of the last-plate. The inserting stroke may be to the desired depth within a rubber lift 1, with respect to a contained reinforcement, or to the tread-surface of a leather heel. Referring to Figs. 2, 10, 11, 12 and 13, I have guided at 200, 200 upon the side-rods 156, 156, a cross-head 202. This is reciprocated by a connection at 204 to an eccentric strap 206, encircling an eccentric 208 fast upon the shaft 14. At opposite sides of the crosshead are upward projections 210, 210, upon which rest collars 212, 212 secured to the side-rods. Thus, the weight of the top-girt, side-rods and cross-girt, which with the drivers 16, 16' may be considered to constitute a driver-assembly, is carried by the crosshead. After the crosshead has descended to a certain distance, a projection 214 from the rear of the cross-girt (Fig. 10) comes into engagement with a lever 216, fulcrumed at 218 upon the frame and held normally raised by a tension-spring 220.

At the center of the crosshead is a downward projection 222, having at the forward and rear sides inclined contact-surfaces 224, 224. Opposed to these surfaces are complemental surfaces 226, 226 upon spaced blocks 228, 228, mounted upon a carrier 230 guided for movement transversely of the machine upon the upper surface of the cross-girt 158. Through the blocks extends a rod 232, having opposite threaded engagement with them at 234. The rod may be turned to cause the separation or approach of the blocks by connections including spiral gearing 236, a horizontal shaft 238 journaled in a crosshead-bracket 240 and splined to the gear 236 which surrounds it, bevel-gearing 242, and a vertical shaft 244 journaled in the bracket 240 and splined to the surrounding bevel-gear. At its upper end, at one side of the jack J, convenient for actuation by the operator, the shaft 244 has fast upon it a hand-crank 246 (Figs. 2 and 16). Reducing gearing 248 joins the shaft 244 to a short parallel shaft 250, journaled with the shaft 244 in a casing 252. Upon the shaft 250 is an indicating disk 254, the periphery of which travels past a fixed index-point 256. The disk may be graduated, as in fractions of an inch, to show the extent to which the drivers 16 and 16' prick the work, this varying as the blocks 228 are shifted by the rotation of the crank to cause the engagement of the sets of opposed surfaces 224 and 226 for a greater or less descent of the crosshead.

To control the travel of the drivers to give the longer pricking stroke followed by the shorter inserting stroke, the carrier 230 is shifted upon the cross-girt 158 transversely of the machine, so that the block-surfaces 226 lie either in or out of the path of the cross head-surfaces 224. Rising from the carrier at the right is a projection 260, provided with a vertical groove 262 (Figs. 13 and 15). In this groove is a roll 264 upon the end of a lever 266, fulcrumed at 268 upon the frame and having at its upper extremity a roll 270 lying in a cam-groove 272 in the cam 42. In each operating cycle of the machine, the eccentric 208 is rotated twice through 360° and the cam 42 once. During the first turn of the eccentric, which produces the pricking stroke of the drivers, the cam 272 and lever 266 hold the carrier 230 so the blocks 228 are at the transverse center of the machine, beneath the crosshead-projection 222. The support of the cross-girt 158 upon the crosshead, by engagement of the side-rod-collars 212 and crosshead-projections 210, holds spaced from each other vertically the projection-surfaces 224 and the block-surfaces 226. This leaves the blocks free for adjustment through rotation of the hand-crank 246, so there may be varied the lost motion of the crosshead before the opposed surfaces come into contact. The idle descent of the cross-girt carried upon the crosshead continues until the cross-girt-projection 214 strikes the end of the lever 216. The travel of the cross-girt is thus yieldably checked, while that of the crosshead continues. When the space between the surfaces 224 and 226 has been taken up by this differential travel, contact between them is established without appreciable shock, and the crosshead moves the cross-girt positively, so the drivers 16, 16' make their pricking stroke. The extent of this may be adjusted accurately by the previous setting of the blocks 228 under the guidance of the indicating means 254, 256, to vary the amount of preliminary lost motion of the crosshead. The drivers having completed their pricking stroke, and been elevated by the eccentric 208, the continuing rotation of the cam 42 actuates the lever 266 to shift the carrier 230 toward the left (Figs. 12 and 13). This removes the blocks 228 from beneath the crosshead-projection 222. Now, there is lost motion of the crosshead during the second rotation of the eccentric 208, until surfaces 280, 280 upon the underside of the cross-girt about the side-rods 156 strike opposed surfaces 282, 282 upon the cross-girt 158. Again said cross-girt is positively actuated by the engagement of these sets of surfaces, the lever 216 yielding, and the drivers 16 making their fastening-inserting stroke, the extent of which is determined by the adjustment of the wedge 178 upon the top-girt 154. In the completion of the operating cycle, the drivers are returned to their raised positions by the eccentric, while the cam 42 restores the blocks 228 to their normal relation beneath the crosshead-projection 222, ready for the succeeding pricking operation. It will be noted, that for the pricking stroke, as well as for the inserting stroke, the actuation of the drivers is by a series of elements which are positively connected throughout. There are interposed no springs, the resistance of which tends to place upon the machine an intermittent overload.

It may be desirable to have the pricking stroke of certain of the drivers, as those designated as 16', 16' and located at the heel-breast, of less extent than that of the associated drivers. This may be because the heel-seat at the breast has a greater outward curvature than the peripheral portion, or because of the presence in this area of metal or other reinforcements. When, however, the inserting stroke is made, the ends of all the drivers should advance to the same plane to correspondingly locate the ends of the fastenings. As shown in Figs. 3, 4, 7 and 9, two breast-drivers are, therefore, carried independently of the drivers 16 upon the secondary plate 173, movable vertically in the space 174 in the lower section of the main plate 168. This secondary plate is provided with a stem 286, guided in the upper section of the main plate. It is held down by gravity, with the lower extremities of its drivers 16' at the level of those of the drivers 16. Above the upper end of the stem 286, in a slot 290 in the underside of the block 150, is a slide 292 with its upper surface abutting against the block and having stepped under surfaces 294 and 296, the former lying in the higher plane (Fig. 4). Into a depression 298 at one side of the rear of the slide projects the vertically extended edge 300 of the end of one arm of a bell-crank-lever 302, fulcrumed upon the frame 15 at the left of the drivers and in a bracket 304 rising from the frame. The extension of the edge 300 gives uninterrupted engagement between the slide and the lever during the reciprocation of the driver-assembly. A second arm of the lever 302 is joined by a link 306 to one arm of a bell-crank-lever 308, fulcrumed at 309 upon the frame outside the lever 304 and having a lower arm provided with a rounded end 310 extending in front of the corner 311 of a reciprocatory slide 312 of the loading mechanism L. This slide carries the multiple block 314, which shears off the fiber f advanced by the feeding mechanism F and transfers it to the inserting mechanism M. This shearing and transferring mechanism is as in the previously mentioned patent, and is more fully described in Letters Patent of the United States No. 2,207,742, LaChapelle, July 16, 1940. From the slide 312 is a projection 316 extending outside the end 310 of the lever 308.

As appears in Fig. 9, the loader-block 314 is back in its fastening-receiving position beneath the foot-plate mechanism P, to which the feeding mechanism F delivers the fiber. In its retreat to this point, the projection 316, engaging the end 310 of the lever 308, has oscillated this lever and the connected lever 302, so the end 300 of the latter has drawn back the slide 292, until the stepped surface 294 is above the stem 286 of the plate 173 carrying the breast-drivers 16'. When the loading mechanism is thus related, the drivers are to make their pricking stroke. Since the breast-drivers are free to rise in the space 174 to the extent permitted by the slide-surface 294, they enter the work to a less depth. When the loader-slide 312 comes forward to make the delivery of the severed fastenings, which the block 314 is carrying in its passages, the corner 311 turns the lever 308 clockwise. This, through the link 306, swings the lever 302 in the same direction, the end 300 thrusting the slide 292 forward. The slide-surface 296 is thereby brought above the stem 286 of the breast-driver-plate, locking this down with the fastening-engaging ends of the drivers 16' in the same plane as that of the drivers 16. This gives the uniform insertion of all the fastenings from the loader-block-passages into the work. In the forward movement of the loader-slide, the projection 316 travels away from the lever-end 310, and as the slide-corner 311 turns the lever 302 it forces this end from the space which it has occupied between the projection and corner. Now, the extended edge 320 at the side of the slide 312 travels along the lever-end, and therefore holds locked in its active position the driver-slide 292. This continues until the slide 312 is retracted after the insertion of the fastenings, when the slide-projection 316 picks up the end of the lever 308 to restore the elements to their normal relation.

The feeding mechanism F, by which the fiber f is supplied to the loading mechanism L, is generally illustrated in Fig. 1 and in more detail in Figs. 3, 4, 5 and 6. The string of fiber f for each of the die-passages 18, 18' is drawn from a coil C, contained in one of a plurality of trays 326 arranged in plural series upon vertical rods 328 rising from the rear of the frame. Each tray is supported upon a projection 330 from the rod, and may be turned upon this about the rod between a normal delivering position and another at one side of the remainder of the series, in which it may receive a fresh coil. Each string of fiber is led up through a guide-tube 332, supported upon a bracket 334 rising from a feeder-frame 336 mounted at the rear of the frame 15. Traversing a space at 338, each string is guided downwardly by a tube 340 clamped at 342 on the feeder-frame. From the tubes 340, the fiber passes through tubes 341 clamped at 343 and is delivered to the foot-plate mechanism P, arranged to direct said fiber to different sets of passages in the multiple loader-block 314. To advance the strings of fiber from the tubes 340 into the tubes 341, they are received between feed-rolls (Fig. 5) having sections 344 and 346 for the peripheral fastenings of the die-passages 18, and shorter sections 348 and 350 for the breast-fastenings of the passages 18'. By this independent feed of the fiber for different portions of the heel, fastenings may be obtained which are of the correct lengths for the particular points of insertion, and therefore may be headed over or upset uniformly throughout. The roll-sections 344, 348 are arranged end-to-end to turn about a horizontal spindle 352 extending across the frame 336. The sections 346, 350 are rotatable about a spindle 354 parallel to the spindle 352 and carried by arms 356, 356, yoked together at 357, turning with a shaft 358 rotatable in the frame 336. All the strings lie in grooves 360 in the roll-sections 344 and 348, and are forced into feeding engagement with said grooves by a yieldable covering 362 of rubber, or the like, upon the sections 346 and 350.

To create the proper feeding contact of the roll-sections with the fiber, the shaft 358 (Fig. 4) has secured to one extremity an arm 364. Turning upon the outer divided end of this arm is a cross-pin 366 having a transverse opening receiving a rod 368, which furnishes one link of a toggle-lever, the other link of which consists of an arm 370 of a bell-crank-lever fulcrumed upon the frame 336 and having a second arm 372 furnishing a hand-lever. Between a nut 374 threaded upon the rod 368 and the pin 366, an expansion-spring 376 is interposed. This spring holds the toggle-arm 370 over the center against a stop 378 upon the frame, at the same time urging the roll-sections 346 and 350 with adjustable pressure against the fiber and the latter against the roll-sections 344 and 348. If the arm 372 is raised and the arm 370 moved away from the stop 378, the toggle-lever will be broken, causing the roll-carrying arms 356, 356 to swing outwardly and separate the roll-sections 346, 350 from the sections 344, 348. This facilitates the drawing back of the fiber from the foot-plate P and its rethreading, when the inserting design is to be changed.

Both the peripheral-roll-sections 344, 346 and the breast-roll-sections 348, 350 are rotated under the influence of the driving mechanism, to give an advance of the fiber equal to the length of the pricking stroke of the drivers 16 and 16', plus an additional amount to provide for the heading or enlarging of the ends of the pegs. On account of the decreased length of pricking at the breast, the feed produced by the roll-sections 348, 350 should be less than that for the other fastenings, to prevent forming projections from the tread-surface of the heel when the fastenings are driven. Obviously, the feed in each instance must be confined to the pricking stroke of the driving mechanism, it being prevented from acting during the inserting stroke. The mechanisms for this purpose are shown most clearly in Figs. 3, 4 and 5. Upon the frame 336 at the left and right of the feed-rolls are actuating racks 386 and 388, respectively, guided for vertical reciprocation. Each of these racks is drawn normally up to a stop-surface 390 by a tension-spring 392. With each rack meshes a pinion 393 rotatable upon the frame, this in turn meshing with a gear-segment 394 turning about the spindle 352 (Fig. 4), an arm 396 projecting from the segment having pivoted upon it double pawls 398, 398. These pawls are forced by spring-plungers 400 against the periphery of a ratchet-wheel 402, there being one of these wheels secured to each of the roll-sections 344 and 348. Double spring-pressed detents 404, pivoted upon the frame, prevent reverse rotation of each of the ratchet-wheels and its roll-section. When either of the racks 386 or 388 is lowered, it turns the pinion 393 and, therefore, the segment 394, and through the pawls 398 rotates the roll-section 344 or 348 with which it is associated. The co-operating sections 346 and 350 are compelled to turn with their companions by spur-gearing 406 connecting them.

To communicate the movement of the driving mechanism to the racks 386 and 388, there are respectively fulcrumed upon the racks at 408 contact-levers 410 and 412 connected by a link 413 to move together. Each of these levers may be considered as a portion of its rack and has at its upper end an angular projection 414, which may either be drawn normally to the right by a tension-spring 415, joining the link to the frame, where said projection is above and backed by a projection 416 from the rack, as appears in Fig. 3, or it may lie to the left of said rack. In the first of these positions, the lever-projection is in the path of a contact-device D or D' (Figs. 7 and 8) corresponding to the racks 386 and 388, respectively. Each of these devices is normally spaced from the lever-projection by a distance substantially equal to the difference between the length of the pricking and inserting strokes of the drivers 16 and 16'. It includes a spindle 418, which may be turned in an eccentric bushing 420, separably held upon the spindle by a cotter-pin 421. The bushing may be rotated about its longitudinal axis in a horizontal bore in the top-girt 154. The rear end of the spindle carries a square head 422. Four contact-surfaces 424 of the head are differently spaced from the axis of the spindle, which may be rotated in the bushing to position any one of the surfaces horizontally at the underside of the head. Here, the selected surface is retained by a spring-pressed pin 426 mounted in the top-girt and engaging any one of four depressions 428 in the head 422. The bushing 420 has at its forward end a head 426, which may be held in any one of five angular positions by a pin 429, projecting from the top-girt and entering a corresponding selected opening 430 in the head 426. This last adjustment will give, for each of the coarse adjustments furnished by the surfaces 424, a fine adjustment, resulting in a variation in vertical position for each of such surfaces by the eccentric bushing. Thus, the extent of travel of the top-girt in engagement with the lever-projections 414 and the movement of the corresponding rack 386 or 388 may be independently adjusted, to give the angles through which the feed-roll-sections 344, 346 and 348, 350 are rotated. In this manner, there may be obtained the desired exact feed of the fiber, which is to furnish both the peripheral and breast-fastenings.

As previously noted, the above-described feed of the fiber into the loading mechanism L must occur only during the pricking stroke of the drivers, to be inserted during the succeeding stroke, at which time the loader-block 314 remains at rest over the die 10. This is accomplished by removing the lever-projections 414 from the paths of the devices D and D' during the inserting movement of the drivers. The contact-lever 410 has a depending arm 438 (Figs. 3 and 7), from which is a horizontal projection 440 lying in proximity to a pin 442 rising from the pivotal connection between the link 306 and the lever 308 in the chain of connections governing the vertical position of the breast-drivers 16', as hereinbefore described. During the pricking stroke of the drivers, the slide 312 and block 314 of the loading mechanism are back in receiving position at the foot-plate mechanism P, and the slide 312 has acted upon the lever 302 to withdraw the slide 392 from above the breast-drivers, the pin 442 being held at its extreme outward position. The projection 440 from the lever 410 is therefore free to be held outwardly, so the projections 414 of the levers 410 and 412 are carried by the spring 415 over the front of the racks 386 and 388, where they are in the path of the corresponding contact devices D and D'. When the top-girt 154 descends in making the pricking stroke, the engagement of the contact devices with the lever-projections carries down the racks 386 and 388 to rotate the roll-sections 344, 346 and 348, 350. There is consequently drawn from the coils C of the fiber different measured lengths of the material for the peripheral and breast-fastenings, as determined by adjustment of the contact devices. When the loader-slide 312 advances to present the severed pegs of fiber above the die 10, it oscillates the lever 302 clockwise (Fig. 9), as it thrusts forward the breast-driver-slide 292. The pin 442 is shifted to the right by the link 306, and, acting upon the lever-projection 440, turns the levers 410 and 412 contraclockwise (Fig. 3). This removes the lever-projections 414 from the path of the contact devices D and D', and the racks 386 and 388 and the feeder mechanism F remain at rest.

That the operator may know, without the necessity for closely following the feed of the fiber, when any one of the coils C is nearly exhausted, a signal mechanism S is made a part of the machine. Referring to Figs. 4 and 6, there is mounted upon the top of the bracket 334, above the space 338 between the adjacent ends of the tubes 332 and 340, a series of feeler-levers 450 fulcrumed upon a spindle 452 extending horizontally between side-walls 454, 454 of the bracket. Between the side-walls is a crossbar 456, in which are mounted spring-plungers 458, one for each feeler, acting to press the downwardly turned end 460 of its feeler against one of the strings as it passes through the space 338. Each feeler has an upward actuating extension which, at 462, lies in proximity to a crossbar 464, supported at its ends by arms 466, 466 yoked together at 467 and pivoted upon the respective side-walls 454, 454. Threaded through the bar 464, in the space at the adjacent ends of the pairs of roll-sections for the peripheral and breast-fastenings, is a screw 468 with its inner end adjacent to the actuating member 470 of a sensitive switch, the casing of which is shown at 472. This switch controls, through conductors indicated at 474, a signal, which may consist of an incandescent lamp 476 placed below the inserting mechanism M and throwing its light upon the jacked work, where its absence will readily be noted by the operator. As long as the string of fiber is passing from one of the tubes 332 into the registering tube 340, it will, by its engagement with the feeler-end 460, prevent the plunger 458 from forcing the feeler-extension 462 against the bar 464. Under these conditions, the screw 468 does not press against the switch member 470, and the switch 472 holds the circuit 474 of the lamp 476 closed. Observing the light, the operator will know that there is still fiber from all the coils C to be delivered by the feeding and loading mechanisms to the inserting mechanism. When the trailing end from any one of the coils passes the space 338, the plunger 458 of the feeler which co-operates with that space urges the end 460 down. The feeler-extension at 462 is forced against the crossbar 464, operating the switch to open the circuit 474, and the lamp 476 is therefore extinguished. When the operator jacks a shoe, he will observe the absence of light upon the jacked work, and is thereby warned that, before the machine is operated, an exhausted coil of fiber must be replaced. This ensures the attachment of all heels by the full number of fastenings.

In the use of the machine, and assuming that there is to be a change in the work required, an alteration of the inserting design and of the depth to which the fastenings are to be driven, the operator, having separated the feed-roll sections 346 and 350 from the sections 344 and 348 by throwing down the hand-lever 372, (Figs. 1, 3, 4 and 5), withdraws the strings f of fiber from the foot-plate mechanism P and adjusts this mechanism for the chosen design. The driver-plate 168 (Figs. 1, 2, 3, 4 and 7) is released from the latch 172 and a plate having the proper arrangement of drivers 16, 16' substituted. The passages in the die 10 and driver-block 314 are in a multiple of all designs. The strings f are drawn from the coils C through the guide-tubes into the foot-plate and loader-block 314, and the roll-sections restored to feeding relation by raising the hand-lever 372. Adjustment of the nut 374 gives the correct feeding pressure between the roll-sections. Movement of the wedge 178 (Figs. 4 and 7) by the screw 190 so locates the driver-block 150, and consequently the lower ends of the drivers, that these drivers will descend in their inserting stroke to points at the reinforcement in a rubber heel or at the tread-surface of a leather heel. Under the guidance of the indicating disk 254 (Fig. 16), the blocks 228 (Figs. 10 and 13) are so positioned upon the cross-girt 158 and spaced from the crosshead-projection 222 as to give to the drivers the desired depth of their pricking stroke. The length of fiber fed to the rolls for each group of fastenings is determined by the setting of the contact-devices D and D' (Figs. 2 and 7) upon the top-girt 154, for the peripheral and breast-fastenings, respectively. This is effected, in a preliminary way, by the position of the heads 422 of the devices and, more precisely, by the bushings 426. If the heel to be attached is made up of a base h and a lift l, the operator places these in the holder H, the lift being uppermost, and places a shoe S on the jack J, with the latter drawn out from beneath the die 10, and pushes said jack into operating position. Depressing the treadle 12, the operator elevates the piston 66 of the fluid-pressure mechanism in the cylinder 64, raising the piston 28 in the cylinder 30 and, therefore, the jack which is carried by the latter piston. The heel-seat of the shoe is thus forced against the heel-base with preliminary pressure of such magnitude that the work may be adjusted as to registration. The movement of the piston 66 also applied pressure to the cylinder 84, so its piston 86 carries the latch 92 into engagement with the teeth 94 of the treadle-link 68. This positively locks the treadle to hold the pressure on the work. Until the latch has been thus actuated, the end of the connected rod 102 will be in the path of the hand-lever 60, preventing its movement to trip the clutch mechanism 56, but as the rod is shifted with the latch by the piston 86, its end is so lowered that the hand-lever is freed, ready for the initiation of the power-cycle of the machine. When the operator presses the hand-lever against the clutch-rod 58, the cam 42 rotates, and, elevating the piston 34 in the cylinder 32, applies final pressure to the work, holding it through the operating cycle. The engagement of the clutch causes the eccentric 208 to make the first of its two turns and lower the cross-head 202. Since the weight of the cross-girt 158 is carried by the crosshead at 210, said cross-girt also descends, carrying with it the connected side-rods 156 and top-girt 154 with the drivers 16 and 16'. By the time the lower ends of the drivers have reached the work, the cross-girt will have arrived at the lever 216 (Figs. 1 and 10), which then retains it until the crosshead-projection 222 strikes the cross-girt-blocks 228. The lever yields, and the drivers, acting as awls, prick through the heel-lift and base into the heel-seat of the shoe to points at or near the inner surface of the insole. Since the loader-slide 312 is now at the foot-plate P, the engaged lever 308 holds the slide 292 withdrawn from the stem 286 of the breast-driver-plate 173, so the breast-drivers 16' are free to rise to the extent permitted by the surface 294 of the slide to conform to the curvature of the heel-seat at the breast and to avoid contact with shank-reinforcements. During the pricking operation of the drivers, the devices D and D' on the top-girt came into engagement with the projections 414 of the contact-levers 410 and 412 upon the feeder-racks 386 and 388, actuating these. Through the interposed gearing 393, 394, 406, they rotate the roll-sections 344, 346 and 348, 350 (Fig. 5) to advance from the coils C, and through the foot-plate P into the passages in the loader-block 314, lengths of fiber f of the proper lengths for the peripheral and breast fastenings, respectively, as determined by the adjustment of the devices D and D'. As the drivers are retracted, the loader-slide and its block advance, shearing off the fastenings and transferring them into registration with the die-block-openings 18 and 18'. The cam-groove 272 (Figs. 14 and 15) now shifts the carrier 230 upon the cross-girt 158 to remove the blocks 228 from beneath the crosshead-projection 222 (Figs. 10 and 13). The eccentric 208 makes its second turn, and the crosshead descends with increased lost motion until the crosshead-surfaces 280 engage the cross-girt-surfaces 282 (Figs. 2, 12 and 13). This causes the drivers to force the fastenings out of the loader-block passages and to make their inserting strokes of such a length as to drive the outer ends of the fastenings to the reinforcement contained in the lift l. Because the loader-slide is forward, it will have so turned the lever 308 and the connected lever 302 that the slide 292 is thrust forward until its surface 296 is above the stem of the breast-driver-plate 173. The drivers 16' are thereby locked down, with their lower extremities in the same plane as those of the peripheral drivers 16. At the same time, the pin 442 is carried by the lever 308 against the projection 440 upon the contact-lever 410 of the feeder-rack 386. This removes the projection 414 of the lever 410 from the path of the contact device D upon the top-girt 154 and, through the link 413, the corresponding projection upon the lever 412 from the path of the device D'. Therefore, the racks are not reciprocated during the inserting stroke of the drivers and there is no feed of the strings f. As the power-cycle of the machine is being completed, the eccentric 208 lifts the crosshead 202, and with it the cross-girt 158 and the other elements of the driver-assembly to their initial positions. The retraction of the loader-slide 312, acting upon the lever 308, withdraws the locking surface of the slide 292 to allow the upward movement of the breast-drivers 16' and also frees the contact-levers 410 and 412 for return to their string-feeding relation. The cam 42 frees the piston 34 so it is quickly lowered by its spring 40. The resulting suction in the fluid-pressure system relieves the pressure upon the latch-piston 86, which is elevated to withdraw the latch 92 from the teeth of the treadle-link 68, so the piston 66 is lowered and the treadle raised. The piston 28 falls in its cylinder, and the jack J may be withdrawn from beneath the die 10 and the heeled shoe removed. If, during the operation, the supply of fastening-material fails, this will be discovered by the corresponding feeler 450 at the space 338 between the guide-tubes for the strings. This feeler will open the contacts of the switch 472 in the circuit of the normally illuminated signal 476 at the inserting mechanism, and the operator, observing the absence of light, will be warned to renew the supply and thus avoid the incomplete attachment of a heel. The machine is lubricated by the same oil that furnishes the fluid-pressure medium.

Having described my invention, what I claim as new and desire to secure by Letters Patent of the United States is:

1. In a fastening-inserting machine, fastening-inserting mechanism, a member movable to hold the work for the operation upon it, a cylinder, a piston in the cylinder movable by the operator to transmit fluid-pressure to the work-holding member, a latching cylinder, a piston movable in the latching cylinder receiving said fluid-pressure, a toothed member movable with the operator-actuated piston, and a latch movable by the latching piston into retaining engagement with the toothed member.

2. In a fastening-inserting machine, fastening-inserting mechanism, a member movable to hold the work for the operation upon it, a cylinder, a piston in the cylinder movable by the operator to transmit fluid-pressure to the work-holding member, a treadle, a link connecting the piston to the treadle and provided with a series of teeth, a latch pivoted for engagement with the teeth, a latching cylinder receiving fluid-pressure from the first-mentioned cylinder, and a piston movable in the latching cylinder to cause the latch to engage the teeth.

3. In a fastening-inserting machine, fastening-inserting mechanism, a member movable to hold the work for the operation upon it, a cylinder, a piston in the cylinder movable by the operator to transmit fluid-pressure to the work-holding member, a treadle, a link connecting the piston to the treadle and provided with a series of teeth, a latch pivoted for engagement with the teeth, a latching cylinder receiving fluid-pressure from the first-mentioned cylinder, a piston movable in the latching cylinder, and a spring through which the movement of the piston is communicated to the latch to cause it to engage the teeth.

4. In a fastening-inserting machine, fastening-inserting mechanism, a member movable to hold the work for the operation upon it, a cylinder, a piston in the cylinder movable by the operator to transmit fluid-pressure to the work-holding member, a treadle, a link connecting the piston to the treadle and provided with a series of teeth, a latch pivoted for engagement with the teeth, a latching cylinder receiving fluid-pressure from the first-mentioned cylinder, a piston movable in the latching cylinder, a spring through which the movement of the piston is communicated to the latch to cause it to engage the teeth, and means connected to the latch to withdraw it from the teeth while compressing the spring.

5. In a fastening-inserting machine, a work-support, mechanism for inserting fastenings in the supported work, clutch mechanism through which power is applied to the inserting mechanism, fluid-pressure mechanism by which the work-support is actuated, means movable to control the fluid-pressure mechanism, and means movable to control the clutch mechanism, movement of the clutch-controlling means being dependent upon the movement of the fluid-pressure-controlling means.

6. In a fastening-inserting machine, a work-support, mechanism for inserting fastenings in the supported work, clutch mechanism through which power is applied to the inserting mechanism, fluid-pressure mechanism by which the work-support is actuated, means movable to control the fluid-pressure mechanism, means movable to control the clutch mechanism, and a member movable by the fluid-pressure controlling means into the path of the clutch-controlling means.

7. In a fastening-inserting machine, a work-support, mechanism for inserting fastenings in the supported work, clutch mechanism through which power is applied to the inserting mechanism, fluid-pressure mechanism by which the work-support is actuated, means by which such actuation is temporarily maintained, a member movable by the operator to release the fluid-pressure mechanism, and a member movable by the operator to trip the clutch mechanism, the clutch-tripping member being retained against movement until the pressure-releasing member has been actuated.

8. In a fastening-inserting machine, a work-support, mechanism for inserting fastenings in the supported work, clutch mechanism through which power is applied to the inserting mechanism, fluid-pressure mechanism by which the work-support is actuated, a latch for retaining the fluid-pressure mechanism in its actuated relation, a rod movable by the operator to release the latch, and a rod movable by the operator to trip the clutch mechanism, the latch-rod preventing movement of the clutch-rod until said latch-rod has released the latch.

9. In a fastening-inserting machine, a work-support, mechanism for inserting fastenings in the supported work, clutch mechanism through which power is applied to the inserting mechanism, a power-cylinder, a piston movable in the power-cylinder for actuating the work-support, a latch for the power-piston to retain the work-support actuated, a rod connected to the clutch mechanism, a lever through which the operator may move the rod to release the clutch, and a rod connected to the latch and normally extending into the path of the lever.

10. In a fastening-inserting machine, a die having fastening-receiving passages, a driver-carrier movable toward and from the die and provided with a passage, a block having a stem extending into the carrier-passage, fastening-drivers mounted upon the block in registration with the die-passages, and means arranged to vary the position of the block-stem longitudinally of the carrier-passage.

11. In a fastening-inserting machine, a die having fastening-receiving passages, a driver-carrier movable toward and from the die and provided with a passage, a block having a stem extending into the carrier-passage, fastening-drivers mounted upon the block in registration with the die-passages, a wedge movable between the carrier and the driver-block, and a screw threaded into the stem and engaging the carrier.

12. In a fastening-inserting machine, a die having fastening-receiving passages, a driver-carrier movable toward and from the die and provided with a passage, a block having a stem extending into the carrier-passage, fastening-drivers mounted upon the block in registration with the die-passages, a wedge carried by the block, means for securing the wedge in different positions, a movable wedge interposed between the block-wedge and the carrier to lower the block upon said carrier, and means arranged to raise the block.

13. In a fastening-inserting machine, a die having fastening-receiving passages, a driver-carrier movable toward and from the die and provided with a passage, a block having a stem extending into the carrier-passage, fastening-drivers mounted upon the block in registration with the die-passages, a wedge carried by the block, means for securing the wedge in different positions, a movable wedge interposed between the block-wedge and the carrier to lower the block upon said carrier, and a screw threaded into the stem and engaging the carrier.

14. In a fastening-inserting machine, a die having fastening-receiving passages, a top-girt for reciprocation toward and from the die and in which is a vertical bore, a block having a stem movable in the bore, fastening-drivers mounted upon the block in registration with the die-passages, a screw threaded into the end of the stem and bearing upon the top-girt, and a wedge movable between the top-girt and the block.

15. In a fastening-inserting machine, a die having fastening-receiving passages, a top-girt for reciprocation toward and from the die and in which is a vertical bore, a block having a stem movable in the bore, fastening-drivers mounted upon the block in registration with the die-passages, a vertical plate secured to the top-girt and against which the block rests, and a wedge movable between the top-girt and the block.

16. In a fastening-inserting machine, a movable carrier, fastening-drivers movable thereby, and an actuating member movable to produce successively work-pricking and fastening-inserting movements of the carrier, the actuating member and carrier having different co-operating contact-surfaces to cause such successive movements.

17. In a fastening-inserting machine, a movable carrier, fastening-drivers movable thereby, and an actuating member movable to the same extent to produce successively work-pricking and fastening-inserting movements of the carrier, the actuating member and carrier having different co-operating contact-surfaces to cause such successive movements.

18. In a fastening-inserting machine, a movable carrier, fastening-drivers movable thereby, and an actuating member movable to produce successively work-pricking and fastening-inserting movements of the carrier, the actuating member and carrier having a set of opposed surfaces contacting to cause work-pricking movement of the carrier and another set of opposed surfaces contacting to cause fastening-inserting movement of the carrier.

19. In a fastening-inserting machine, a movable carrier, fastening-drivers movable thereby, an actuating member movable to produce successively work-pricking and fastening-inserting movements of the carrier, the actuating member and carrier having a set of opposed surfaces contacting to cause work-pricking movement of the carrier and another set of opposed surfaces contacting to cause fastening-inserting movement of the carrier, and means arranged to vary the initial distance between the surfaces of one of the sets.

20. In a fastening-inserting machine, a movable carrier, fastening-drivers movable thereby, an actuating member movable to produce successively work-pricking and fastening-inserting movements of the carrier, the actuating member and carrier having a set of opposed surfaces contacting to cause work-pricking movement of the carrier and another set of opposed surfaces contacting to cause fastening-inserting movement of the carrier, and means for moving the work-pricking surfaces out of and into active relation.

21. In a fastening-inserting machine, a reciprocatory actuating member, a driver-assembly carried by the actuating member toward the work, and means for checking the advance of the driver-assembly to permit the actuating member to engage and positively advance said driver-assembly.

22. In a fastening-inserting machine, a reciprocatory crosshead, a reciprocatory cross-girt sustained by the crosshead, fastening-drivers connected to the cross-girt, and means for yieldingly arresting movement of the cross-girt and permitting the crosshead to advance into actuating engagement with the cross-girt.

23. In a fastening-inserting machine, a reciprocatory crosshead, a reciprocatory cross-girt sustained by the crosshead, fastening-drivers connected to the cross-girt, means for yieldingly arresting movement of the cross-girt and permitting the crosshead to advance into actuating engagement with the cross-girt, and a contact member movable between the crosshead and the cross-girt to vary such actuating engagement.

24. In a fastening-inserting machine, a reciprocatory crosshead, a reciprocatory cross-girt sustained by the crosshead, fastening-drivers connected to the cross-girt, means for yieldingly arresting movement of the cross-girt and permitting the crosshead to advance into actuating engagement with the cross-girt, and a contact member movable under the power of the machine between the crosshead and the cross-girt to vary such actuating engagement.

25. In a fastening-inserting machine, a reciprocatory crosshead, a reciprocatory cross-girt sustained by the crosshead, fastening-drivers connected to the cross-girt, means for yieldingly arresting movement of the cross-girt and permitting the crosshead to advance into actuating engagement with the cross-girt, a contact member movable under the power of the machine between the crosshead and the cross-girt into and out of active position in which it transmits movement of the crosshead to the cross-girt, and means arranged to vary the active position of the contact member.

26. In a fastening-inserting machine, a reciprocatory crosshead, a cross-girt reciprocated by the crosshead, fastening-drivers connected to the cross-girt, a contact-block variable in position and through which movement of the crosshead is communicated to the cross-girt, and mechanism for shifting the contact-block.

27. In a fastening-inserting machine, a reciprocatory crosshead, a cross-girt reciprocated by the crosshead, drivers connected to the cross-girt and furnishing a part of fastening-inserting mechanism, a contact-block variable in position and through which movement of the crosshead is communicated to the cross-girt, and means connected to the block and extending into proximity to the fastening-inserting mechanism for shifting the block.

28. In a fastening-inserting machine, a frame, a fastening-receiving die mounted thereon, a reciprocatory driver-block, a driver movable upon the block and co-operating with the die, a movable loading member delivering fastenings to the die, a slide movable upon the block and controlling the position of the driver, a lever fulcrumed upon the frame and engaging the slide, and means for communicating movement of the loading member to the lever.

29. In a fastening-inserting machine, a frame, a fastening-receiving die mounted thereon, a reciprocatory driver-block, a driver movable upon the block and co-operating with the die, a movable loading member delivering fastenings to the die, a slide movable upon the block and controlling the position of the driver, a lever fulcrumed upon the frame and engaging the slide to shift it in opposite directions during reciprocation of the loading member, and means for communicating movement of the loading member to the lever.

30. In a fastening-inserting machine, a frame, a fastening-receiving die mounted thereon, a reciprocatory driver-block, a driver movable upon the block and co-operating with the die, a movable loading member delivering fastenings to the die, a slide movable upon the block to control the position of the driver and being provided with a depression, a lever fulcrumed upon the frame and having an arm with an extended edge lying in the depression, and means for communicating the movement of the loading member to the lever.

31. In a fastening-inserting machine, a fastening-receiving die, a reciprocatory driver-block, a driver movable upon the block and co-operating with the die, a reciprocatory loading member delivering fastenings to the die, a slide movable upon the block and controlling the position of the driver, and connecting means for transmitting to the slide the movement of the loading member in opposite directions.

32. In a fastening-inserting machine, a fastening-receiving die, a reciprocatory driver-block, a driver movable upon the block and co-operating with the die, a reciprocatory loading member delivering fastenings to the die, a slide movable upon the block and controlling the position of the driver, and connecting means for transmitting to the slide the movement of the loading member in opposite directions, said loading member during its movement in one direction engaging the connecting means to lock the slide.

33. In a fastening-inserting machine, a frame, a fastening-receiving die mounted thereon, a reciprocatory driver-block, a driver movable upon the block and cooperating with the die, a reciprocatory loading member delivering fastenings to the die, a slide movable upon the block and controlling the position of the driver, a lever fulcrumed upon the frame and engaging the slide, a lever fulcrumed upon the frame for engagement by the loading member, and means for connecting the levers to move together.

34. In a fastening-inserting machine, a frame, a fastening-receiving die mounted thereon, a reciprocatory driver-block, a driver movable upon the block and co-operating with the die, a reciprocatory loading member delivering fastenings to the die, a slide movable upon the block and controlling the position of the driver, a lever fulcrumed upon the frame and engaging the slide, a lever fulcrumed upon the frame and at one extremity receiving contact of opposite surfaces of the loading member and also of an extended edge thereof, and means for connecting the levers to move together.

35. In a fastening-inserting machine, a frame, fastening-inserting mechanism mounted thereon, loading mechanism by which fastenings arranged in accordance with different inserting designs may be delivered to the inserting mechanism, a feed-roll for fastening-material rotatable upon the frame, arms pivoted upon the frame, a feed-roll carried by the arms and co-operating with that first mentioned to advance fastening-material to the loading mechanism, a toggle-lever having links connected to the carrier-arms and to the frame, and a hand-lever projecting from the frame-connected link of the toggle-lever and by which said toggle-lever may be broken to separate the rolls and facilitate rethreading of the fastening-material to the loading mechanism.

36. In a fastening-inserting machine, a frame, fastening-inserting mechanism mounted thereon, loading mechanism by which fastenings arranged in accordance with different designs may be delivered to the inserting mechanism, a feed-roll for fastening-material rotatable upon the frame, arms pivoted upon the frame, a feed-roll carried by the arms and co-operating with that first mentioned to advance fastening-material to the loading mechanism, a connecting arm turning with the carrier-arms, a toggle-lever having a link movable through the connecting arm and a link pivoted to the frame, and a spring surrounding the movable link and resisting its movement through the connecting arm.

37. In a fastening-inserting machine, a frame, fastening-inserting mechanism mounted thereon, loading mechanism by which fastenings arranged in accordance with different designs may be delivered to the inserting mechanism, a feed-roll for fastening-material rotatable upon the frame, arms pivoted upon the frame, a feed-roll carried by the arms and co-operating with that first mentioned to advance fastening-material to the loading mechanism, a connecting arm turning with the carrier-arms, a toggle-lever having a link movable through the connecting arm and a link pivoted to the frame, a nut threaded upon the movable link, and an expansion-spring abutting against the nut and the connecting arm.

38. In a fastening-inserting machine, fastening-inserting mechanism including a movable driver-assembly provided with a contact-portion fixed in position upon it, mechanism having a movable feed member by which fastening-material is advanced for insertion, and an actuating member for the feed member, the contact-portion of the driver-assembly being normally spaced from the actuating member but traveling into engagement with it.

39. In a fastening-inserting machine, fastening-inserting mechanism including a movable driver-assembly provided with a contact-portion fixed in position upon it, mechanism having a movable feed member by which fastening-material is advanced for insertion, an actuating member for the feed member, the contact-portion of the driver-assembly being normally spaced from the actuating member but traveling into engagement with it, and means arranged to vary the time of engagement.

40. In a fastening-inserting machine, fastening-inserting mechanism including a movable driver-assembly provided with a contact-portion fixed in position upon it, means arranged to vary such position, mechanism having a movable feed member by which fastening-material is advanced for insertion, and an actuating member for the feed member, the contact-portion of the driver-assembly being normally spaced from the actuating member but traveling into engagement with it.

41. In a fastening-inserting machine, fastening-inserting mechanism including a movable driver-assembly provided with a device having a plurality of contact-faces any one of which may be presented in active relation, a movable feed member by which the fastening-material is advanced for insertion, and an actuating member for the feed member movable by the active contact-face.

42. In a fastening-inserting machine, fastening-inserting mechanism including a movable driver-assembly provided with a device having a plurality of contact-faces any one of which may be presented in active relation, and means arranged to vary the position of each contact-face in its active relation.

43. In a fastening-inserting machine, fastening-inserting mechanism including a movable driver-assembly, a spindle rotatable in the driver-assembly and having a head furnishing a plurality of contact-surfaces, means for fixing any one of the contact-surfaces in active relation, an eccentric bushing rotatable in the driver-assembly about the spindle, means for fixing the bushing in different rotary positions, a movable feed member by which fastening-material is advanced for insertion, and an actuating member for the feed member movable by the active contact-surface.

44. In a fastening-inserting machine, fastening-inserting mechanism including a movable driver-assembly provided with a plurality of contact-portions, a plurality of movable feed members by which fastening-material is advanced for insertion, and an actuating member for each feed member engaged by one of the contact-portions.

45. In a fastening-inserting machine, fastening-inserting mechanism including a movable driver-assembly provided with a plurality of contact-portions, a plurality of movable feed members by which fastening-material is advanced for insertion, an actuating member for each feed member engaged by one of the contact-portions, and means arranged to vary independently the time of engagement of each contact-portion.

46. In a fastening-inserting machine, fastening-inserting mechanism including a movable driver-assembly provided with a contact-portion fixed in position upon it, mechanism having a movable feed member by which fastening-material is advanced for insertion, an actuating member for the feed member, and a contact member movable upon the actuating member into and out of active position in which it is engaged by the contact-portion.

47. In a fastening-inserting machine, fastening-inserting mechanism including a movable driver-assembly provided with a plurality of contact-portions, a plurality of movable feed members by which fastening-material is advanced for insertion, an actuating member for each feed member, and a contact member movable upon each actuating member into and out of active position in which it is engaged by the corresponding contact-portion.

48. In a fastening-inserting machine, fastening-inserting mechanism including a reciprocatory driver-carrier provided with a projection, movable feed-rolls by which fastening-material is advanced for insertion, and a reciprocatory rack geared to the feed-rolls and into engagement with which the carrier-projection is movable.

49. In a fastening-inserting machine, fastening-inserting mechanism including a reciprocatory driver provided with a plurality of projections, plural pairs of rotatable feed-rolls by which fastening-material is separately advanced for insertion, and a reciprocatory rack geared to each pair of feed-rolls and into engagement with which the corresponding carrier-projection is movable.

50. In a fastening-inserting machine, fastening-inserting mechanism including a reciprocatory driver-carrier provided with a projection, movable feed-rolls by which fastening-material is advanced for insertion, a reciprocatory rack geared to the feed-rolls, and a lever fulcrumed upon the rack and being movable into and out of the path of the projection.

51. In a fastening-inserting machine, fastening-inserting mechanism, mechanism by which fastenings are transferred to the inserting mechanism, and feeding mechanism for fastening-material controlled by the transferring mechanism.

52. In a fastening-inserting machine, fastening-inserting mechanism, mechanism by which fastenings are transferred to the inserting mechanism, and a plurality of feed mechanisms for fastening-material each of which is controlled by the transferring mechanism.

53. In a fastening-inserting machine, fastening-inserting mechanism including a movable driver-assembly provided with a contact-portion fixed in position upon it, mechanism having a movable feed member by which fastening-material is advanced for insertion, an actuating member for the feed member, a contact member movable upon the actuating member into and out of active position in which it is engaged by the contact-portion, and a movable loading member for the inserting mechanism by which the contact member is moved.

54. In a fastening-inserting machine, fastening-inserting mechanism including a reciprocatory driver-carrier provided with a projection, a movable loader-block delivering fastenings to the inserting mechanism, rotatable feed-rolls by which fastening-material is advanced to the loader-block, a reciprocatory rack geared to the feed-rolls, a lever fulcrumed upon the rack and movable into and out of the path of the projection, and means for transmitting movement of the loader-block to the lever.

55. In a fastening-inserting machine, fastening-inserting mechanism including a reciprocatory driver-carrier provided with a plurality of projections, a movable loader-block delivering fastenings to the inserting mechanism, two pairs of rotatable feed-rolls by which the fastening-material is separately advanced for insertion, a reciprocatory rack geared to each pair of feed-rolls, a lever fulcrumed upon each rack and movable into and out of the path of one of the projections, means for transmitting the movement of the loader-block to one of the levers, and a member joining said lever to the other lever.

56. In a fastening-inserting machine, fastening-inserting mechanism including a movable carrier, a fastening-driver movable upon the carrier, mechanism for transferring fastenings to the inserting mechanism, mechanism for feeding fastening-material for transfer, and means whereby the transferring mechanism controls the feeding mechanism and the movement of the driver.

57. In a fastening-inserting machine, fastening-inserting mechanism including a reciprocatory carrier, a fastening-driver movable upon the carrier, mechanism for transferring fastenings to the inserting mechanism, mechanism for feeding fastening-material for transfer, and a lever movable by the transferring mechanism and having a portion for controlling the feeding mechanism and a portion controlling the movement of the driver.

58. In a fastening-inserting machine, fastening-inserting mechanism including a reciprocatory carrier, a fastening-driver movable upon the carrier, a slide movable upon the carrier and controlling the movement of the driver, a reciprocatory loader-block for transferring fastenings to the inserting mechanism, rotatable rolls by which fastening-material is advanced for transfer, a member movable by the carrier to rotate the rolls and having a portion movable into and out of the path of the carrier, and means whereby the movement of the loader-block is communicated to the slide and to the member.

59. In a fastening-inserting machine, fastening-inserting mechanism including a reciprocatory carrier, a fastening-driver movable upon the carrier, a slide movable upon the carrier and controlling the movement of the driver, a reciprocatory loader-block for transferring fastenings to the inserting mechanism, rotatable rolls by which fastening-material is advanced for transfer, a member movable by the carrier to rotate the rolls and having a portion movable into and out of the path of the carrier, a lever movable by the loader-block, a lever engaged by the slide and having a portion contacting with the member, and a member joining the two levers.

FRANK E. STRATTON.